US008581908B2

(12) United States Patent
Mihara et al.

(10) Patent No.: US 8,581,908 B2
(45) Date of Patent: Nov. 12, 2013

(54) GRAPHICS-RENDERING APPARATUS

(75) Inventors: Isao Mihara, Tokyo (JP); Yasukazu Higuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1775 days.

(21) Appl. No.: 11/689,833

(22) Filed: Mar. 22, 2007

(65) Prior Publication Data
US 2007/0236499 A1    Oct. 11, 2007

(30) Foreign Application Priority Data

Mar. 28, 2006   (JP) ................... P2006-088704

(51) Int. Cl.
G06T 11/20 (2006.01)
G09G 5/00 (2006.01)
(52) U.S. Cl.
USPC .......................................... 345/441; 345/581
(58) Field of Classification Search
USPC ................... 345/621–629, 581, 441
See application file for complete search history.

(56) References Cited

U.S. PATENT DOCUMENTS

| 4,897,805 | A | * | 1/1990 | Wang ............................. 345/441 |
| 4,962,468 | A | * | 10/1990 | Beauregard et al. .......... 345/441 |
| 5,014,223 | A | * | 5/1991 | Tanimori ........................ 338/99 |
| 5,485,559 | A | * | 1/1996 | Sakaibara et al. ............. 345/505 |
| 5,673,379 | A | * | 9/1997 | Diehl ............................. 345/441 |
| 5,710,578 | A | * | 1/1998 | Beauregard et al. .......... 345/441 |
| 6,111,587 | A | * | 8/2000 | Covey et al. ................... 345/629 |
| 6,215,501 | B1 | * | 4/2001 | Takita ........................... 345/581 |
| 6,466,229 | B1 | * | 10/2002 | Nagao ........................... 345/621 |

FOREIGN PATENT DOCUMENTS

JP    10-187386    7/1998

OTHER PUBLICATIONS

U.S. Appl. No. 11/689,825, filed Mar. 22, 2007, Higuchi, et al.
Lee Ziqiang, "A Filling Algorithmic of Filling Any Region with Italicized Filling-line", Natural Science Journal of Xiangtan University, vol. 21, No. 1, Mar. 31, 1999, pp. 60-65 (with English abstract).
Renate Kempf, et al., "OpenGL Processing Pipeline", Chapter 2: Overview of Commands and Routines, Open GL Reference Manual Second Edition, 1997, pp. 8-15.
Mark de Berg, et al., "Polygon Triangulation, Guarding an Art Gallery", Computational Geometry, 2000, pp. 44-61.
Jackie Neider, et al., "Drawing Filled, Concave Polygons Using the Stencil Buffer", Chapter 13: Now That You Know, Open GL programming Guide, 1993, pp. 398-399.
Ola Andersson, et al., "Scalable Vector Graphics (SVG) 1.1 Specification", W3C Recommendation Jan. 14, 2003, http://www.w3.org/TR/SVG/, Jan. 14, 2003, pp. 1-719.

* cited by examiner

*Primary Examiner* — Kee M Tung
*Assistant Examiner* — Nurun N Flora
(74) *Attorney, Agent, or Firm* — Oblon, Spivak, McClelland, Maier & Neustadt, L.L.P.

(57)   ABSTRACT

A graphic object is rendered by means of managing a processing sequence and data, both of which pertain to a vector to be processed included in a vector data group to become inputs; extracting data pertaining to data to be processed from the vector data group which are to become inputs, in accordance with management information; computing sequence of processing of the extracted vector data; notifying management of a target point to be processed and completion of processing of a target vector, through use of the computed processing sequence information; determining whether or not fill-in of the target point to be processed is enabled, on the basis of management information about the target point to be processed, to thus compute fill-in information; and rendering a graphic object through use of the computed fill-in information.

19 Claims, 21 Drawing Sheets

POLYGON INCLUDING INDENTED SHAPE

POLYGON INCLUDING SELF-INTERSECTIONS

IN THE CASE OF y1=y2

IN THE CASE OF y1<y2

IN THE CASE OF y1>y2

FIG. 17

| SCAN LINE NUMBER | FILL-IN INFORMATION | |
|---|---|---|
| 0 | LINE IN POINT | xi0(0), xi0(1),... |
| | LINE OUT POINT | xo0(0), xo0(1),... |
| 1 | LINE IN POINT | xi1(0), xi1(1),... |
| | LINE OUT POINT | xo1(0), xo1(1),... |
| 2 | LINE IN POINT | xi2(0), xi2(1),... |
| | LINE OUT POINT | xo2(0), xo2(1),... |
| ... | ... | ... |
| 1078 | LINE IN POINT | xi1078(0), xi1078(1),..., xi1078(n) |
| | LINE OUT POINT | xo1078(0), xo1078(1),... |
| 1079 | LINE IN POINT | xi1079(0), xi1079(1),... |
| | LINE OUT POINT | xo1079(0), xo1079(1),... |

GRAPHICS-RENDERING APPARATUS

RELATED APPLICATION

The present disclosure relates to the subject matter contained in Japanese Patent Application No. 2006-088704 filed on Mar. 28, 2006, which is incorporated herein by reference in its entirety.

FIELD

The present invention relates to a graphics-rendering apparatus and a graphics-rendering method.

BACKGROUND

Various methods for rendering an arbitrary polygon have been developed. The methods include (1) a point-based method, (2) a raster-line-based method, (3) a triangle-based method, and (4) a stencil-buffer-based methods.

The method (1) is a method for determining rendering with regard to respective points (pixels) included in a rendering area and performing rendering operation on a per-point (pixel) basis. In order to speed up rendering operation, various contrivances, such as deletion of useless rendering areas or simplifying a determination of a drawing at each of the points, have been conceived. Moreover, in order to achieve a speedup in rendering, the function is often embodied in the form of hardware. One device into which the method is embodied as hardware is called a rasterizer (see, e.g., the background-art document 1 listed below). This method is simple and hence is characterized by very stable operation, but has a drawback of a necessity for making a determination of rendering for each point, thereby entailing very high processing cost. For this reason, the function is typically embodied as custom-designed hardware.

The method (2) corresponds to an improvement on the method (1). The method (2) is analogous to the method (1) in that a drawing is determined on a per-dot basis or within a range corresponding to each dot. However, when rendering is performed, rendering portions in the respective points are collected, and the thus-collected rendering portions are replaced with line drawings of respective scan lines of a screen on which rendering is desired to be effected. Thus, in relation to determination of a drawing, the method (2) entails high processing cost, as does the method (1). However, cost of rendering operation is curtailed, and hence the method (2) is expected to become faster than the method (1). Determining a drawing entails processing performed by a processing system having a high-speed CPU or realization of processing in the form of custom-designed hardware. A general-purpose graphics LSI (GPU) can be used for rendering operation. The reason for this is that the graphics LSI has the function of rendering lines and triangles at high speed. For this reason, the method (2) can be said to have enhanced versatility as compared with the method (1).

The method (3) is for dividing a polygon desired to be drawn into a group of triangles and rendering the polygon from triangles (see, e.g., the background-art document 2 listed below). This intends to achieve a speedup on the premise of the use of a general-purpose graphics LSI or a high-speed triangulation rendering apparatus (because the graphics LSI has the function of rendering lines and triangles at high speed). Therefore, the method (3) is superior to the methods (1) and (2) in terms of versatility. However, triangulation requires complicated processing, and hence stability of complicated processing may pose a problem. When a polygon desired to be drawn has a very complicated shape, there also arises a problem of triangulation processing involving a very large cost. Since the method is based on the premise that a group of triangles are rendered by use of a graphics LSI or the like, the LSI cannot be used when it has insufficient resources. The reason for this is that the polygon must be divided into a group of triangles; and that the thus-divided triangles must be fed to the graphics LSI, which in turn entails a comparative increase in the volume of usage of memory.

The method (4) is completely based on usage of a general-purpose graphics LSI, and polygon rendering is implemented by use of a function called a stencil buffer provided in the graphics LSI (see, e.g., the background-art document 3 listed below). This method enables more stable and faster polygon rendering than that provided by any one of the methods (1) through (3). However, the method entails full usage of the features of the graphics LSI, and hence there arises a problem of a necessity for a large amount of resource of the graphics LSI.

Background-Art Document 1:
Renate Kempf and Chris Frazier, "The Open GL Processing Pipeline," Chapter 2: Overview of Commands and Routines, Open GL Reference Manual Second Edition, ISBN 0-201-46140-4, pp. 8 to 16, 1997.

Background-Art Document 2:
Mark de Berg, Mare van Kreveld, Mark Overmars, and Otfried Schwartzkopf "Computational Geometry," ISBN 4-7649-0277-X, pp 44 to 61, Kindai Kagakusha Co, Ltd., 2000.

Background-Art Document 3:
Jackie Neider, Tom Davis, Mason Woo, "Drawing filled, Concave Polygons Using the Stencil Buffer," Chapter 13: Now That You Know, OpenGL programming Guide, ISBN 0-201-63274-8, p. 398-399, 1993.

SUMMARY OF THE INVENTION

One of objects of the present invention is to provide a graphics-rendering apparatus and a graphics-rendering method which enable high-speed operation under stable operation and low usage of resources. Specifically, the present invention provides a graphics-rendering apparatus and a graphics-rendering method, which enable the fastest-possible operation under the circumstances where difficulty is encountered in usage of hardware resources of a graphics LSI or the like, by use of a simple method of enabling operation that is as stable as possible.

According to a first aspect of the invention, there is provided a graphics-rendering apparatus including: a vector data group management unit that manages a vector data group including sets of vector data based on first management information; a vector data extraction unit that extracts vector data as a target vector to be processed from the vector data group in accordance with the first management information; a processing sequence computing unit that computes a processing sequence of the target vector extracted by the vector data extraction unit; a target point management unit that generates a second management information for managing a target point by determining the target point to be processed in accordance with the processing sequence, and notifies the vector data group management unit of completion of processing of the target vector; a fill-in information computing unit that determines whether or not the target point is to be filled in based on the second management information, and computes fill-in information that indicates the determination result of filling the target point in; and a rendering unit that renders a polygon by use of the fill-in information.

According to a second aspect of the invention, there is provided a graphics-rendering apparatus including: a vector data group management unit that manages a vector data group including sets of vector data based on first management information; a vector data extraction unit that extracts vector data as a target vector to be processed from the vector data group in accordance with the first management information; a starting-point-and-end-point computing unit that computes starting-point-and-end-point information that indicates starting and end points of the processing, based on the vector data extracted by the vector data extraction unit; a target point management unit that generates a second management information for managing a target point by determining the target point to be processed in accordance with the starting-point-and-end-point information, and notifies the vector data group management unit of completion of processing of the target vector; a target point computing unit that computes coordinates of a pixel of the target point to be processed, based on the second management information; a target point determination unit that determines whether or not to fill in pixels on both sides of the coordinates of the target point to be processed; a fill-in information computing unit that computes fill-in information regarding the target point based on the determination result of the fill-in information determination unit; a fill-in information storage unit that stores the fill-in information; a fill-in information registration unit that registers into the fill-in information storage unit the fill-in information computed by the fill-in information computing unit; a rendering area computing unit that computes and updates a rendering area where the polygon is to be rendered, based on the vector data extracted by the vector data extraction unit; a rendering area correction unit that generates rendering area information by performing a correction to the rendering area computed by the rendering area computing unit; a rendering data correction unit that generates data optimal for rendering by performing a correction to the fill-in information stored in the fill-in information storage unit; and a rendering unit that renders a polygon by use of the rendering area information and the data generated by the rendering data correction unit.

According to a second aspect of the invention, there is provided a graphics-rendering method including: managing a processing sequence of sets of vector data included in a vector data group; extracting vector data as a target vector to be processed from the vector data group in accordance with first management information; computing the processing sequence of the extracted vector data; managing a target point to be processed in accordance with a second management information and the computed processing sequence; notifying a completion of the processing of the target vector; determining whether or not the target point is to be filled in based on the second management information; computing fill-in information that indicates the determination result; and rendering a polygon by use of the computed fill-in information.

According to a fourth aspect of the invention, there is provided a computer-readable program product causing a computer system to perform a process for rendering a polygon. The process includes: managing a processing sequence of sets of vector data included in a vector data group; extracting vector data as a target vector to be processed from the vector data group in accordance with first management information; computing the processing sequence of the extracted vector data; managing a target point to be processed in accordance with a second management information and the computed processing sequence; notifying a completion of the processing of the target vector; determining whether or not the target point is to be filled in based on the second management information; computing fill-in information that indicates the determination result; and rendering a polygon by use of the computed fill-in information.

BRIEF DESCRIPTION OF THE DRAWINGS

In the accompanying drawings:

FIG. 17 is a view describing a fill-in information storage area;

DETAILED DESCRIPTION OF THE EMBODIMENT(S)

Figure 1:
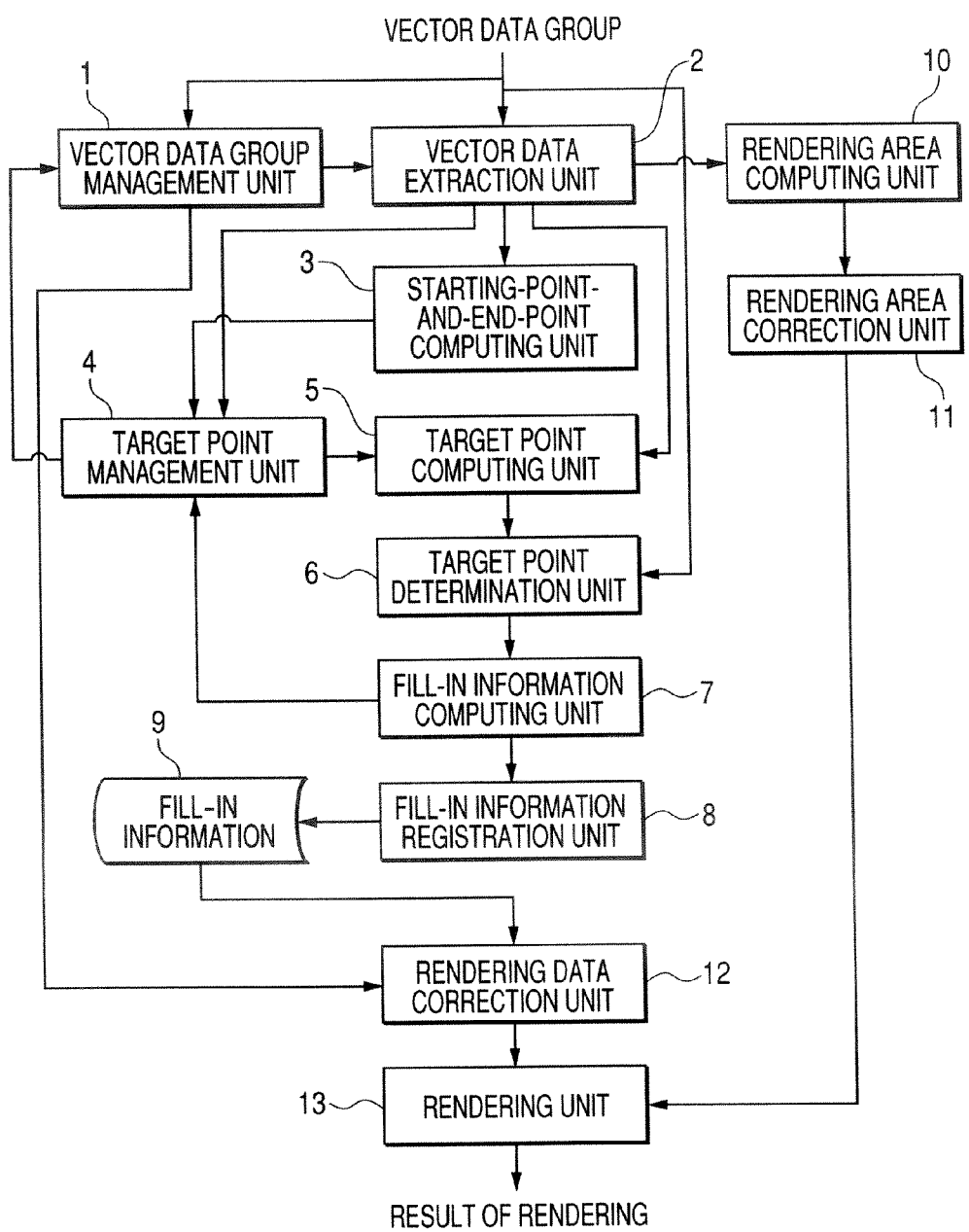
FIG. 1 is a view for schematically showing an example configuration of a graphics-rendering apparatus according to a embodiment of the present invention.

An embodiment of the present invention will be described hereinbelow by reference to the drawings Overall Configuration of a Graphics-Rendering Apparatus FIG. 1 is a block diagram of the entirety of a graphics-rendering apparatus according to the embodiment of the present invention.

The graphics-rendering apparatus according to the embodiment includes: a vector data group management unit 1 for managing a vector data group which are to become inputs; a vector data extraction unit 2 for extracting vector data to be processed from the vector data group which are to become inputs, in accordance with management information employed in the vector data group management unit 1; a starting-point-and-end-point computing unit 3 for computing starting and end points of processing from the vector data extracted by the vector data extraction unit 2; a target point management unit 4 for determining a target point to be processed by use of starting-point-and-end-point information computed by the starting-point-and-end-point computing unit 3 and/or notification information about completion of processing of a target point acquired from a fill-in information computing unit 7, and for notifying the vector data group management unit 1 of completion of processing of a target vector; a target point computing unit 5 for computing coordinates of a pixel of the target point to be processed, from information about the target point to be processed determined by the target point management unit 4; a target point determination unit 6 for determining whether or not to fill in pixels on both sides of coordinates of the target point to be processed computed by the target point computing unit 5; the fill-in information computing unit 7 for determining whether the target point is a fill-in starting point, a fill-in end point, or neither of these, on the basis of a result of determination made by the target point determination unit 6, and computing the target point as fill-in information of predetermined format along with coordinates of the target point; a fill-in information registration unit 6 for registering into a fill-in information storage area 9 the fill-in information computed by the fill-in information computing unit 7; a rendering area computing unit 10 for computing and updating information about the minimum rectangular area required for rendering a graphic object, from the vector data extracted by the vector data extraction unit 2; a rendering area correction unit 11 for performing a correction to the rectangular area computed by the rendering area computing unit 10, to thus determine an area where rendering is to be finally performed; a rendering data correction unit 12 for correcting the fill-in information stored in the fill-in information storage area 9 as data optimal for rendering; and a rendering unit 13 for rendering a graphic object by use of the rendering area information acquired by the rendering area correction unit 11 and the data corrected by the rendering data correction unit 12.

Vector Data Group Management Unit

The vector data group management unit 1 will now be described.

Description of Graphics Rendering

Graphics rendering described in connection with the embodiment will now be described. Graphics rendering performed in the embodiment is for rendering a graphic object formed from a polygon indicated by input data, through use of the input data formed from a vector data group forming the polygon or a point data group corresponding to the polygon. At that time, the inside of the graphic object is filled in, in accordance with a predetermined rule.

Figure 2:
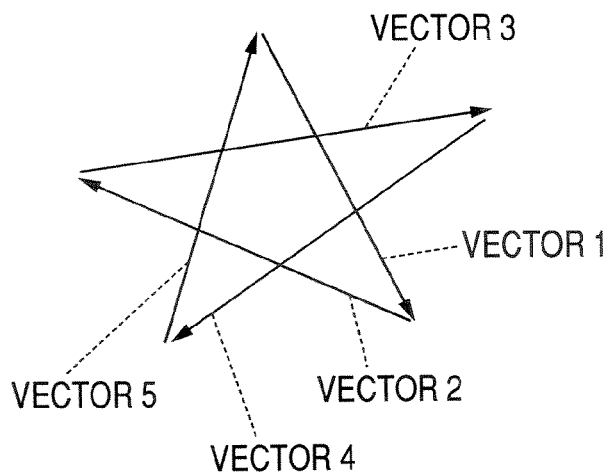
FIG. 2 is a view for describing a vector data group.
Figure 3:
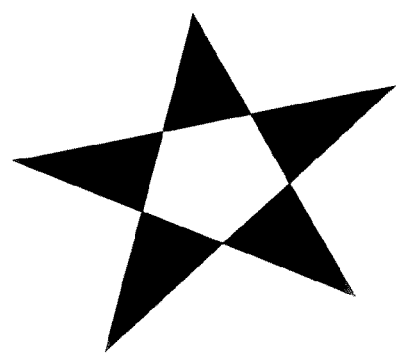
FIG. 3 is a view describing graphics rendering.
Figure 4:
FIG. 4 is a view describing graphics rendering.

Specifically, provided that there have been input a vector data group forming a "polygon (obtained through a single writing stroke)," such as "vector 1" to "vector 5" shown in FIG. 2, figures such as those shown in FIGS. 3 and 4 are rendered. A difference between FIGS. 3 and 4 lies in a difference in the rules used for filling in the inside of the polygon. FIG. 3 shows an example where the inside of a polygon (a star in this embodiment) is filled in accordance with a rule called an even-odd fill rule. FIG. 4 is an example where an analogous polygon is filled in in accordance with a rule called a non-zero fill rule.

The even-odd fill rule and the non-zero fill rule are briefly described. The even-odd fill rule is for drawing a half line (emitting a ray) in an arbitrary direction from an arbitrary point in the inside of an area (a closed path); incrementing or decrementing a counter according to the direction where the half line and the edge of the area intersect; and determining that the area where the counter reads an odd number is filled in and that the area where the counter reads an even number is not filled in. The non-zero fill rule is for filling in the area where the counter does not read zero as a similar result of incrementing or decrementing of the counter.

Details of the rules described above are described in a document "Scalable Vector Graphics (SVG) 1.1 Specification", W3C Recommendation 14 Jan. 2003. The document is available at a web site: www.w3.org/TR/SVG The two rules; namely, the even-odd fill rule and the non-zero fill rule, have been described as example fill rules. These are mere examples, and the present invention is not limited to them. An arbitrary fill rule can be used.

Description of a Vector Data Group

A vector data group which is to form an input of a graphic object to be rendered, or a point data group corresponding thereto, will now be described.

Figure 5:
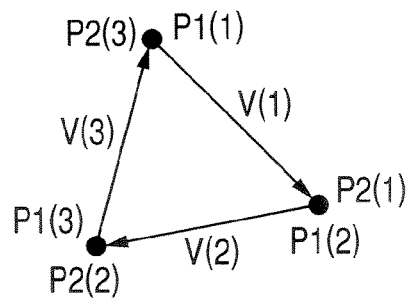
FIG. 5 is a view describing a polygonal graphic object.

A vector data group described herein is sets of vector data including two sets of point data $P1(n)$ (a starting point), $P2(n)$ (an end point), each of which has two-dimensional (or three-dimensional) coordinates, where $n=1, \ldots, N$, and N denotes the number of vectors constituting a vector data group. A vector $V(n)$ represented by a set of vector data is denoted as such by $V(n)=P2(n)-P1(n)$. Reference symbol $V(n)$ denotes a vector represented by the n-th set vector data; $P1(n)$ denotes point data pertaining to a starting point forming the n-th vector; and $P2(n)$ denotes point data pertaining to an end point forming the n-th vector. In a vector data group handled in the present invention, vectors which are continual with each other share an end point. In short, a relationship of $P1(n)=P2(n-1)$ stands. The thus-obtained vector data group forms a polygonal graphic object drawn with a single stroke of the pen (see FIG. 5). FIG. 5 shows an example obtained provided that $N=3$ is achieved, and a triangle is formed as a graphic object.

Figure 6:
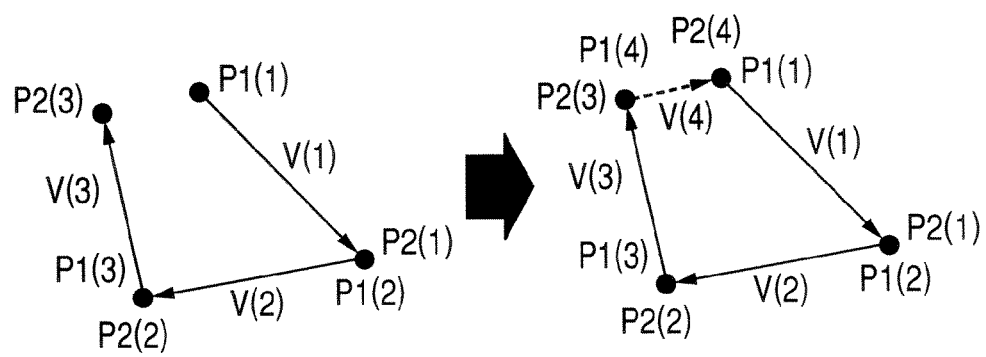
FIG. 6 is a view describing an unclosed polygonal graphic object.

When $P2(N)=P1(1)$ is not attained, a formed graphic object is not closed. In this case, provided that the N+1th point represented by $P1(N+1)=P2(N)$ and $P2(N+1)=P1(1)$ is virtually present, a graphic object is taken as a closed graphic object (see FIG. 6). In the case of FIG. 6, a graphic object is taken as a closed quadrilateral square provided that a virtual vector point $V(4)$ is present.

Figure 7:
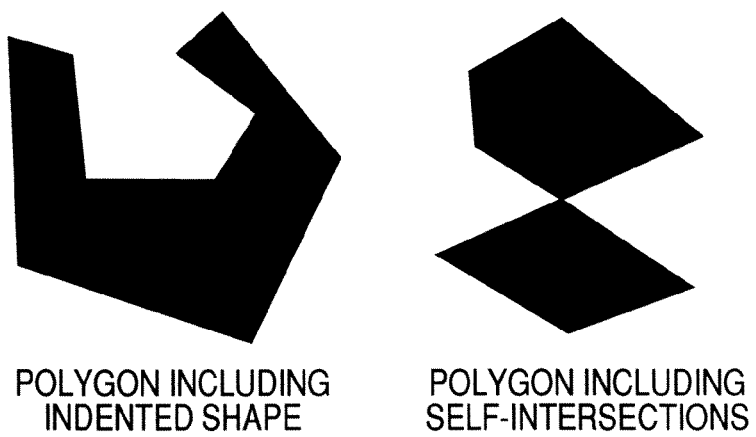
FIG. 7 is a view describing a polygonal graphic object.

The polygon formed from a vector data group may assume an arbitrary shape made up of common polygons, and may assume a recessed shape or a self-intersecting shape as well as a projecting shape (see FIG. 7).

A point data group can also be handled in the same manner as is the vector data group. On the assumption that a point data group is represented as P(n), n=1, ... N, V(n) defined below corresponds to the vector data group $$V(n)=P(n+1)-P(n)\ n=1,\ldots,N-1,\tag{1}$$

When a point data group has been input, the input can be handled as a vector data group by means of the above conversion.

Descriptions of the Vector Data Group Management Unit

The vector data group management unit 1 is for managing the vector data group obtained as an input for graphics rendering as mentioned above.

Specifically, the vector data group management unit 1 manages which one of the vector data group obtained as inputs is a set of vector data which is to become a current object of processing.

At the time of initiation of processing, the first set of vector data in the vector data group is selected as an object of processing. In subsequent steps, the vector data group management unit 1 receives from a target point management unit 4, which will be described later, a notification of completion of processing of point data which are to become an object of processing; and sequentially updates vector data which are to become an object of processing as second vector data, third vector data, . . . . When vector data which are to become an object of processing are no longer present, notification of completion of processing is sent to a rendering unit 12 which will be described later.

Figure 8:
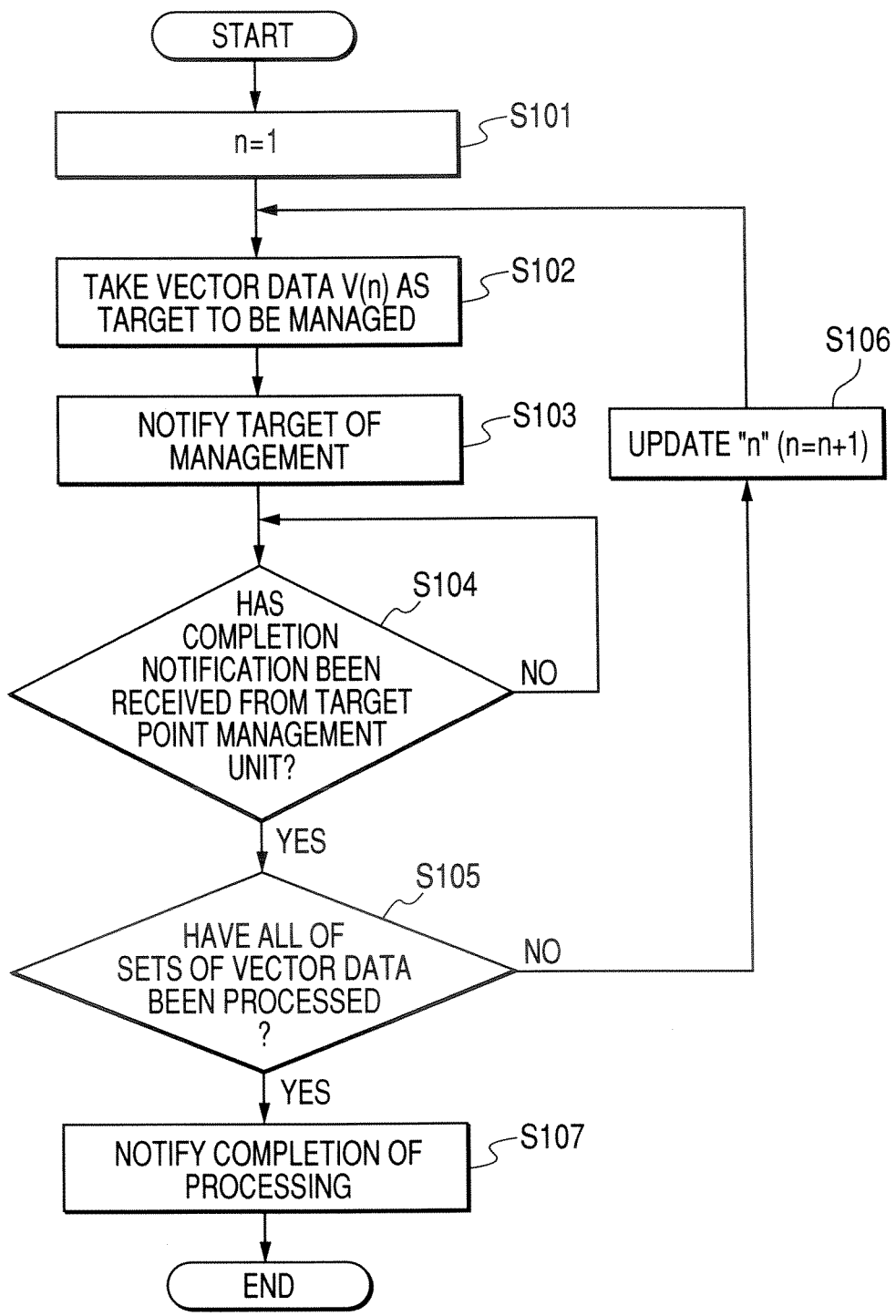
FIG. 8 is a view describing the processing flow of a vector data group management unit.

A detailed processing flow of the vector data group management unit 1 will be provided below (FIG. 8). First, the vector data group management unit 1 sets the number "n" of a vector to be processed to "1" (S101). Next, the vector data group management unit 1 sets the vector data V(n) as an object of management (S102). Next, the vector data group management unit 1 notifies to the vector data extraction unit 2 of the vector data V(n) as an object of processing (S103). Next, the vector data group management unit 1 waits for a notification of completion issued by the target point management unit 4. Upon receipt of the notification of completion, the vector data group management unit 1 proceeds the processing to the next step (S104). In step S105, the vector data group management unit 1 determines whether or not all of the sets of vector data have been processed. When not all of the sets of vector data have been processed, processing proceeds to step S106. When all of the sets of vector data have been processed, processing proceeds to step 107. In step S106, the vector data group management unit 1 updates the vector number "n" of an object of processing. Typically, the "n" is incremented by one, and processing returns to step S102. Updating is not necessarily performed in a continual manner A predetermined set of vector data can also be taken as an object of management according to an arbitrary rule. In step S107, the vector data group management unit 1 sends a notification of completion of processing to the rendering unit 12. The above are details of a typical processing flow.

In the embodiment, the vector data V(n) notified from the vector data group management unit 1 to the vector data extraction unit 2 at step S103 serves as vector number information.

The vector data group management unit 1 is for managing vector data V(n) which are to become an object of processing in subsequent processing operations. The above processing flow is merely an example. V(n) selected by use of an arbitrary selection method can be taken as an object of processing.

Vector Data Extraction Unit

The vector data extraction unit 2 will now be described.

The vector data extraction unit 2 is for acquiring, from an input vector data group, vector data including coordinates of the vector starting point P1; coordinates of the vector end point P2, and attribute information that indicates a color used for filling a vector, through use of the vector number information about an object of processing notified by the vector data group management unit 1.

In the embodiment, the vector number information serves as a first management information, based on which the vector data group management unit 1 manages the vector data group.

Although example coordinates and color attributes have been described as vector data, the present invention is not limited to them. All or some of types of data included in a vector data group obtained as inputs can be acquired.

The thus-acquired vector data are passed to a starting point-and-end-point computing unit 3 which will be described later.

Starting-Point-and-End-Point Computing Unit

The starting point-and-end-point computing unit 3 will now be described.

The starting point-and-end-point computing unit 3 is for computing the starting point and the end point of subsequent processing from data pertaining to vectors which are objects of processing and have been received from the vector data extraction unit 2.

In subsequent operations, graphics-rendering operation of the embodiment is described wherein graphics-rendering operation is performed while the vertical direction (the direction of the Y axis) is taken as a reference. This is merely an example, and the present invention is not limited to the example. Graphics-rendering operation can also be performed while the horizontal direction (the direction of the X axis) is taken as a reference or while an arbitrary direction is taken as a reference. The direction of the principal axis of a graphic object desired to be rendered (a direction in which dispersion becomes minimum), or the likes can also be conceived as an arbitrary direction. Further, the direction is not limited to a two-dimensional direction.

Figure 9:
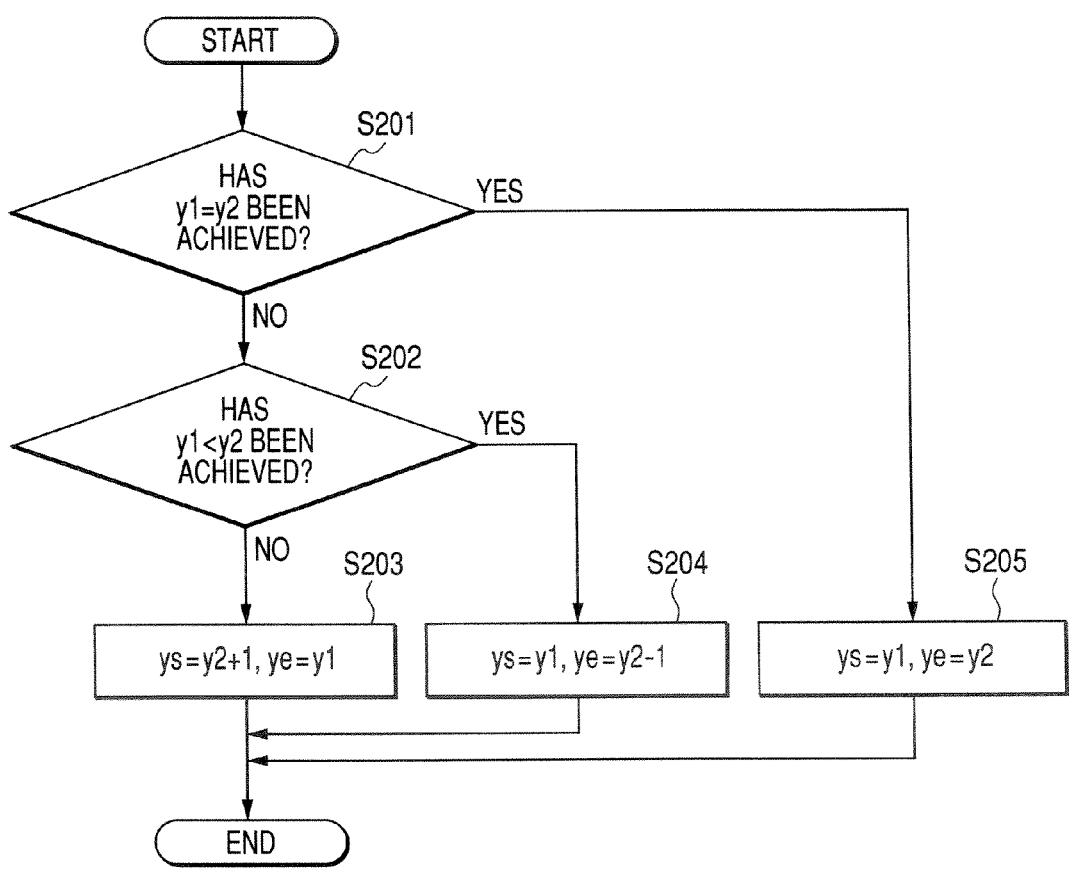
FIG. 9 is a view describing the processing flow of a starting-point-and-end-point computing unit.

The starting-point-and-end-point computing unit 3 basically computes the "y" coordinate of the starting point and the "y" coordinate of the end point while taking a point having a smaller "y" coordinate among two points P1 (the start of the vector) and P2 (the end of the same), both of which included the vector data, as a starting point and while taking another point having a larger "y" coordinate as an end point. A detailed processing flow is provided below (FIG. 9).

The coordinates of the point P1 are taken as (x1, y1) and coordinates of the point P2 are taken as (x2, y2) First, the "y" coordinate of the point P1 and the "y" coordinate of the point P2 are compared with each other, to thus determine whether or not both "y" coordinates are equal to each other (y1=y2) (S201). When they are equal to each other, processing proceeds to step S205. When they are not equal to each other, processing proceeds to step S202. In step S202, a determination is made as to whether or not a relationship of y1<y2 is achieved. When the relationship is true, processing proceeds to step S204. In contrast, when the relationship is false, processing proceeds to step S203.

In step S203, the "y" coordinate ys of the starting point is set to y2+1, and the "y" coordinate ye of the end point is set to y1. Similarly, in step S204, the coordinate ys is set to y1, and the coordinate ye is set to y2−1. In step S205, the coordinate ys is set to y1, and the coordinate ye is set to y2.

Figure 10A:
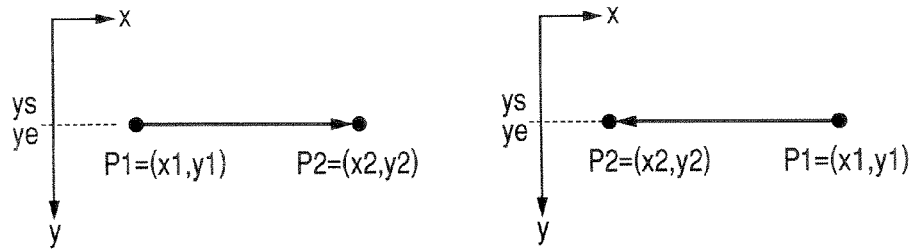
FIGS. 10A-10C are views schematically describing computation of a starting point and an end point.
Figure 10B:
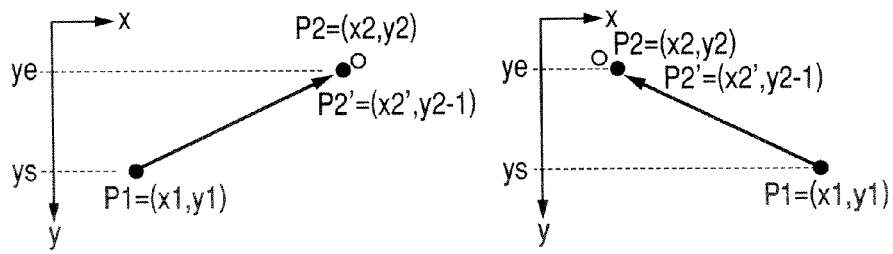
Figure 10C:
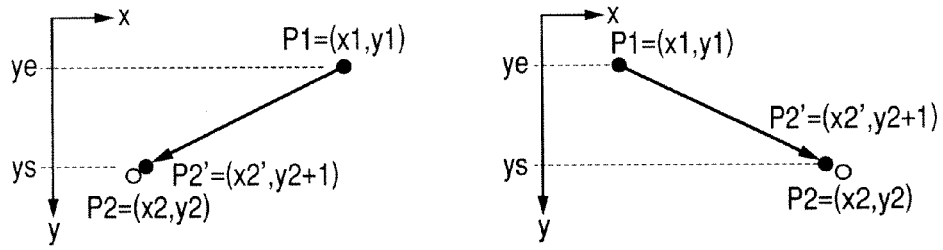

FIGS. 10A to 10C diagrammatically show these relationships. When the "y" coordinate of the point P1 is equal to the "y" coordinate of the point P2 (FIG. 10A), two possibilities are present as illustrated. In any event, ys=ye=y1 (=y2) is achieved. In this case, the starting point and the end point have the same "y" coordinate.

When a relationship of y1<y2 is achieved; namely, when the "Y" coordinate of P1 is smaller as shown in FIG. 10B, the "y" coordinate y1 of P1 is taken as a starting point, and a "y" coordinate y2-1 of a point P2', which is located before P2, is taken as an end point.

Figure 11:
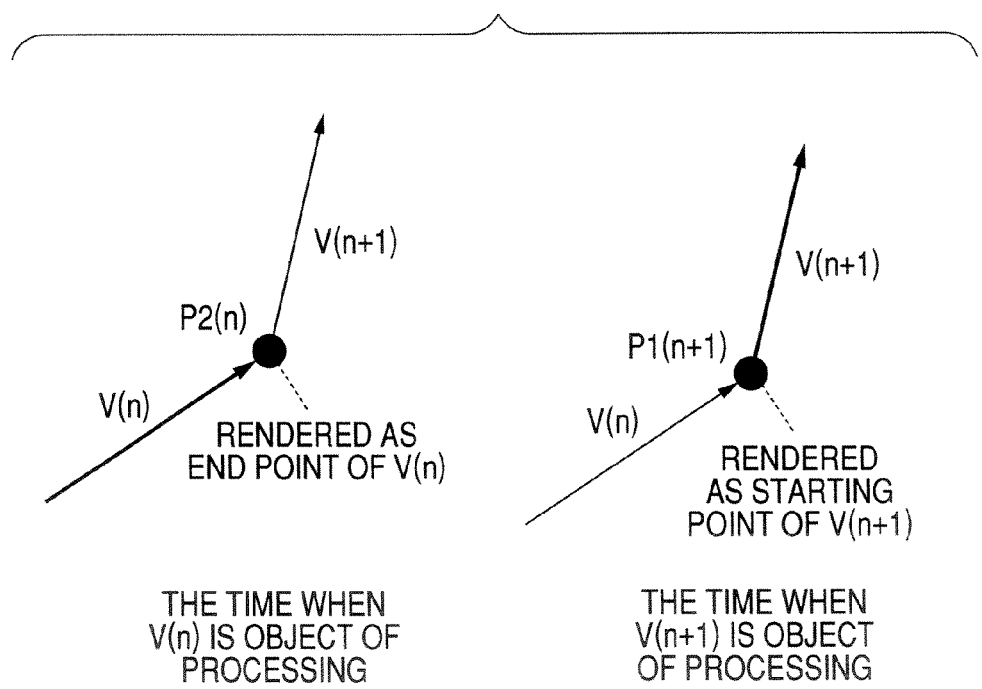
FIG. 11 is a view showing double processing of a point common to continual vectors.

The reason why P2 is not selected simply as an end point is because P2 becomes the start of the next vector, and hence processing for rendering operation is performed at the time of processing of the next vector. If P2 is included in the end point in this step, processing becomes double. When consideration is given to processing cost, rendering efficiency is deteriorated (FIG. 11). In the drawing, P1(n+1)=P2(n) is achieved, and hence a deterioration in rendering efficiency arises.

Likewise, when y1>y2 is achieved; namely, when the "y" coordinate of P1 is larger as shown in FIG. 10C, the "y" coordinate y2+1 of a point P2' located before P2 is taken as a starting point, and the "y" coordinate y1 of P1 is taken as an end point.

There has been illustrated the example where an adjacent point is computed for the purpose of enhancing rendering efficiency rather than a point to be doubly processed being computed as the "y" coordinate ye of the end point. However, the present invention is not limited to this example. Another acceptable arrangement is for the "y" coordinate of a point having a larger "y" coordinate to be computed simply as an end point.

The "y" coordinate of the starting point and that of the end point have been computed thus far. The starting-point-and-end-point computing unit 3 sends the result to the target point management unit 4 to be described later.

The case where a point having the smaller "y" coordinate is taken as a starting point and a point having the larger "y" coordinate is taken as an end point has been illustrated. However, the present invention is not limited to this. Conversely, a point having a larger "y" coordinate may be taken as a starting point, and a point having a smaller "y" coordinate taken as an end point.

Alternatively, a starting point P1 of a vector may also be simply taken as a starting point, and an end point P2 may also be taken as an end point. Conversely, the point P2 may also be taken as a starting point, and the point P1 may also be taken as an end point.

A method other than those mentioned above may also be adopted, so long as the manner of selecting a starting point and an end point is consistent over the entire vector data, and subsequent processing to be described later can be uniquely performed by use of the computed starting point and the computed end point. The reason why the "y" coordinate is taken as a reference is because, as mentioned above, the embodiment is described by use of the example where the vertical direction is taken as a reference. The embodiment is not limited to this example. The reference direction may be changed as appropriate in such a manner that a similar advantage is yielded in the reference direction.

Although the example where vector data are acquired has been described above, the same also applies to a case where a point data group is input, as mentioned above (see a paragraph <Descriptions of the Vector data group>). When a point data group has been input, the starting-point-and-end-point computing unit 3 performs the above-described conversion, and handles the converted data as vector data, to thus perform similar processing Target Point Management Unit The target point management unit 4 will now be described.

The target point management unit 4 is for receiving data—which have been acquired by the vector data extraction unit 2 and pertain to a vector to be processed—and the starting-point-and-end-point data computed by the starting-point-and-end-point computing unit 3, and dividing the vector data into points (pixels) to thus manage the vector data as data pertaining to points (pixels) to be processed.

Figure 12:
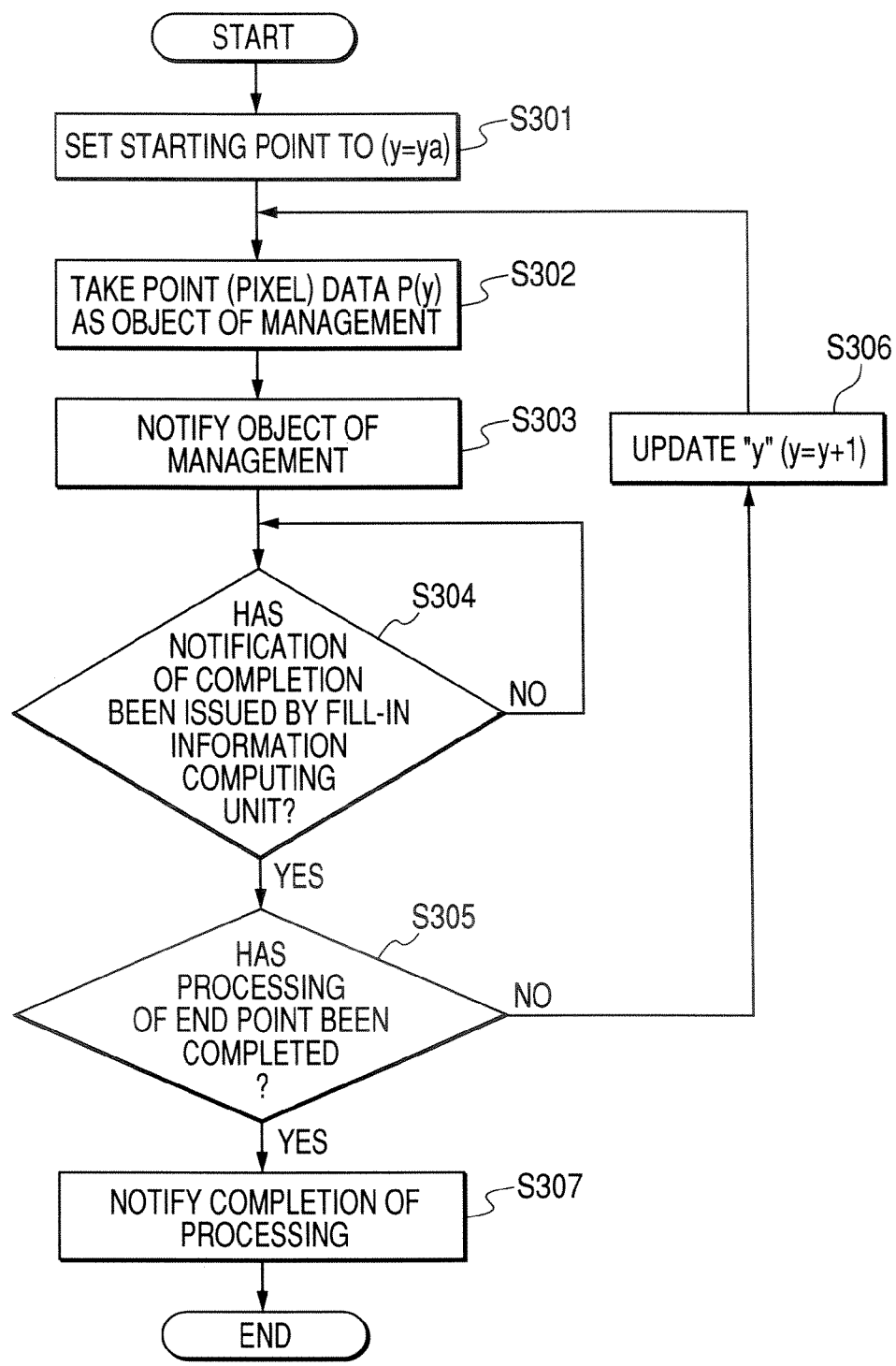
FIG. 12 is a view describing the processing flow of a target point management unit.

Specifically, the target point management unit 4 operates as indicated by the processing flow shown in FIG. 12. First, the starting point computed by the starting-point-and-endpoint computing unit 3 is set as a target point to be processed (a target pixel to be processed) (S301). Next, the point to be processed (the value of the coordinate "y" is a current target point) is taken as an object of management (S302). A target point computing unit 5, which will be described later, is notified of information about a point, such as a "y" coordinate, taken as an object of management in step S302 (S303). The target point management unit 4 awaits a notification of completion of processing from a fill-in information computing unit 7, and proceeds to step S305 after having received the notification. In step S305, a determination is made as to whether or not processing of the end point computed by the starting-point-and-end-point computing unit 3 has been completed. When processing of the end point has not yet been completed, processing proceeds to step S306. When processing of the end point is determined to have been completed, processing proceeds to step S307. In step S306, the "y" coordinate of the target point to be managed is updated, and processing returns to step S302. In step S307, a message stating that the target point management unit 4 has completed processing is transmitted to the vector data group management unit 1.

In the embodiment, the target point management unit 4 serves as a processing sequence computing unit that computes a processing sequence of the vector data extracted by the vector data extraction unit 2.

Target Point Computing Unit

The target point computing unit 5 will now be described.

The target point computing unit 5 receives data pertaining to a vector to be processed, which has been acquired by means of the vector data extraction unit 2, and the information about a target point to be managed, which has been notified by the target point management unit 4, and computes data pertaining to coordinates of the target point to be managed.

The equation of a partial line extending between two points; namely, the starting point P1 and the end point P2, can be acquired, in the form of Equation (2) provided below, from the data pertaining to the starting point P1 and the end point P2 of the vector included in the vector data acquired by the vector data extraction unit 2.

$$\begin{cases} x = x1 & \text{(when } y1 = y2\text{)} \\ x = \frac{(y-y1)*(x2-x1)}{y2-y1} + x1 & \text{(when } y1 \neq y2\text{)} \end{cases} \quad (2)$$

Reference symbol "y" must satisfy $\min(y1, y2) \leq y \leq \max(y1, y2)$. Reference symbol min(a, b) denotes a function which returns "a" or "b," whichever coordinate has a smaller value, and max(a, b) denotes a function which returns "a" or "b," whichever coordinate has a larger value.

By use of the Equation (2), the "x" coordinate of the target point to be managed can be computed from the "y" coordinate of the target point to be managed included in the management target point information notified by the target point management unit 4.

The target point computing unit 5 determines coordinates (x, y) of the target point to be managed by means of combining together the computed "x" coordinate of the target point to be managed and the "y" coordinate acquired by the target point management unit 4, and sends the coordinates (x, y) to a target point determination unit 6 to be described later.

The method of computing the "x" coordinate from the equation of a line by use of Equation (2) has been described above. However, the present invention is not limited to this method. The "x" coordinate can also be computed by use of another method, such as the Bresenham line algorithm, or the like. When the Bresenham line algorithm is used, the previously-described target point management unit 4 computes the initial "x" coordinate of the starting point beforehand. The target point computing unit 5 computes only differential information, thereby rendering computation faster. The "x" coordinate may also be computed by use of a method other than that mentioned above.

Target Point Determination Unit

The target point determination unit 6 will now be described.

The target point determination unit 6 determines whether or not points (pixels) located on both sides of the target point are areas to be filled in, by use of the coordinates of the target point to be processed computed by the target point computing unit 5 and the vector data group which are to become inputs; and outputs information about the determination about the pixels along with the coordinates of the target point to be processed.

Specifically, provided that the coordinates of the target point P to be computed by the target point computing unit 5 are (x, y), a determination is made as to whether or not two points located on both sides of the target point; namely, point Pleft (x−1, y) and point Pright (x+1, y), are areas to be filled.

Determination of Area to be Filled in

Determination of an area to be filled in will now be described. Determination of an area to be filled in is for determining whether or not a target point is an area to be filled in as determined by a predetermined rule. In the following descriptions, determination of an area to be filled in is described while the previously-described non-zero fill rule is taken as a fill rule.

Figure 13:
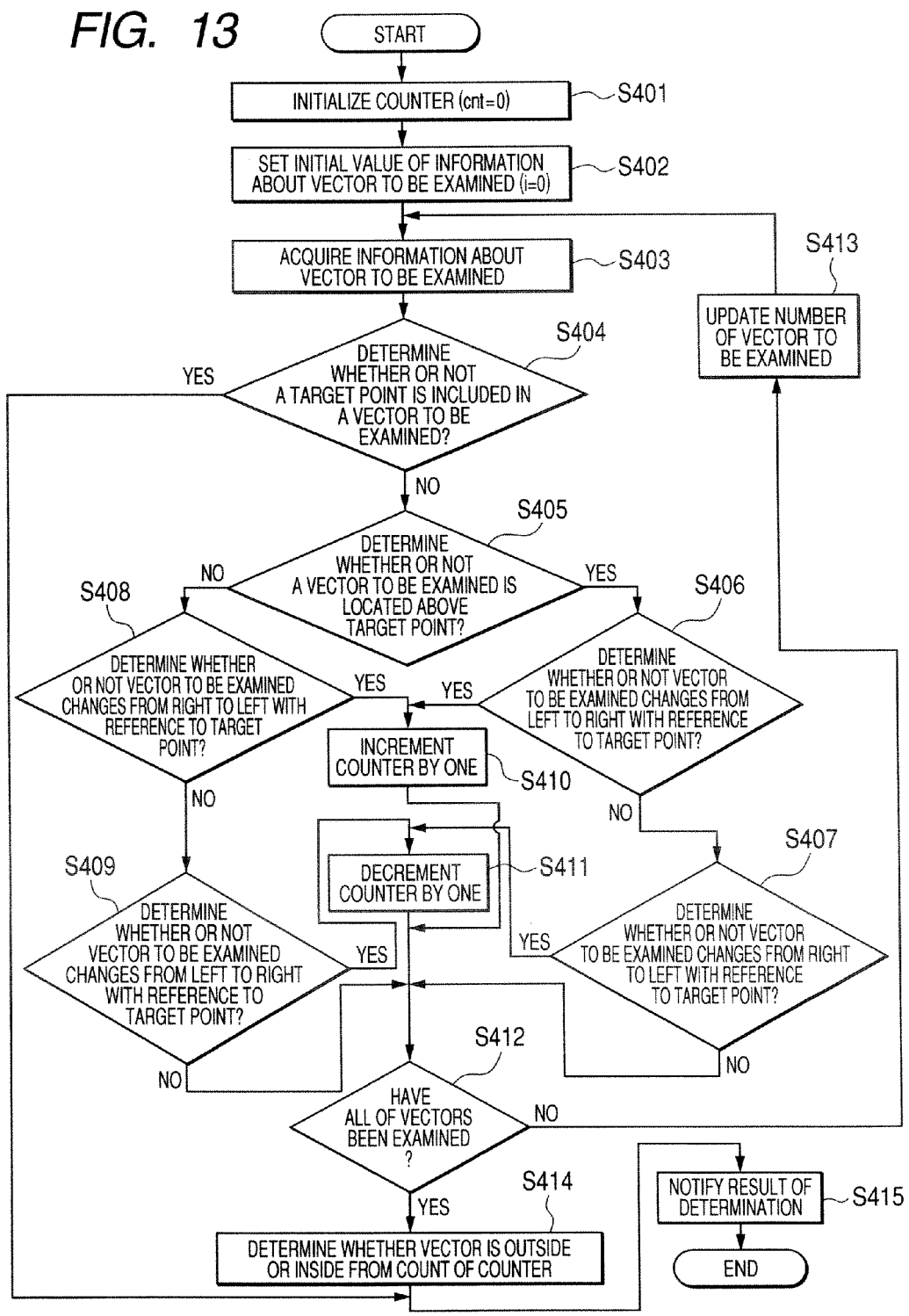
FIG. 13 is a flowchart of determination of a fill-in area.

FIG. 13 is a flowchart of a determination of an area to be filled in.

In step S401, a count of a counter is reset (cnt=0).

In step S402, a vector number to be examined is initialized (i=0).

In step S403, information about a vector to be examined is acquired. Data pertaining to a vector V(i) to be examined are acquired by use of a current vector number "i."

In step S404, a determination is made as to whether or not the target point is included in the vector V(i) to be examined A determination method is to examine whether or not coordinates of the target point are included in a partial line labeled as the vector V(i). Another method may also be used for determination. When the coordinates are included, the target point is determined to be an area to be filled in, and processing proceeds to step S415. When the coordinates are not included, processing proceeds to S405.

In step S405, a determination is made as to whether or not the target point is located above the vector to be examined. When the target point is located above the vector, processing proceeds to step S406. Otherwise, processing proceeds to step S408.

In step S406, in relation to the target point, a determination is made as to whether or not the vector to be examined changes from left to right. When the vector changes, processing proceeds to step S410. Otherwise, processing proceeds to step S407.

In step S407, a determination is made as to whether or not the vector to be examined changes from right to left. When the vector changes, processing proceeds to step S411. If not, processing proceeds to step S412.

In step S408, in relation to the target point, a determination is made as to whether or not the vector to be examined changes from right to left. When the vector changes, processing proceeds to step S410. Otherwise, processing proceeds to step S409.

In step S409, a determination is made as to whether or not the vector to be examined changes from left to right. When the vector changes, processing proceeds to step S411. Otherwise, processing proceeds to step S412.

In step S410, the count of the counter is incremented by one (cnt=cnt+1)

In step S411, the count of the counter is decremented by one (cnt=cnt−1).

In step S412, a determination is made as to whether or not examination of all the vectors has been completed If examination has not been completed, processing proceeds to S413. If examination has been completed, processing proceeds to S414.

In step S413, the vector to be examined is updated (i=i+1), and processing returns to step S403.

In step S414, a determination as to fill-in is made on the basis of the count (cnt) of the counter. Specifically, when the count of the counter is not zero, the target point is determined to be an area to be filled in. If not, the target point is determined not to be an area to be filled in.

In step S415, a result of the determination as to whether or not the target point is an area to be filled in is notified, and processing is terminated.

The above description relates to example fill-in determination processing based on the non-zero fill rule. In this example, an operator imagines standing at the position of the target point, and sequentially watches a polygon formed from the vector data group for each set of vector data to thus examine whether or not the operator's body makes one turn. In the area where the body makes one turn, the count of the counter assumes a non-zero value, and the target point is determined to be an area to be filled in.

The above-described determination method is merely an example, and the present invention is not limited to this example. Another determination method, such as a method for drawing a straight line passing through a target point and examining the number of times the line crosses the vector data group, and the like, can also be used.

Although the fill-in rule has been described thus far while the non-zero fill rule is taken as an example, the fill-in rule is not limited to this rule. An even-odd fill rule or another rule can also be used. When the rule has changed, a method for determining whether or to enable fill-in is also changed separately. In such a case, a method complying with the above rule or another method can also be used.

Output of the Result of a Determination of Both Points

The target point determination unit 6 acquires a result of the determination as to whether or not the points located on both sides of the target point; namely, the Pleft (x−1, y) and Pright (x+1, y), are to be filled in, by use of the above-described "Determination of an Area to be Filled in." The result is output along with information about the coordinates of a target point.

Fill-In Information Computing Unit

The fill-in information computing unit 7 will now be described.

The fill-in information computing unit 7 determines whether or not the target point is a point to be involved in fill-in operation in a scan line, on the basis of the coordinates of the target point to be processed acquired from the target point determination unit 6 and information about a determination whether or not points (pixels) located on both sides of the target point are to be filled in. When the target point is involved in fill-in operation, the fill-in information computing unit 7 generates the information.

Here, the scan line is defined as a line including a target point; namely, a line expressed by $y=y1$ when coordinates of a target point are $(x1, y1)$.

Graphics Rendering for Each Scan Line

First, graphics rendering operation for each scan line will be described. Graphics rendering for each scan line is for rendering a fill-in area of a graphic object for each scan line by means of a plurality of lines, provided that rendering is taken as processing performed on a per-scan-line basis.

Figure 14:
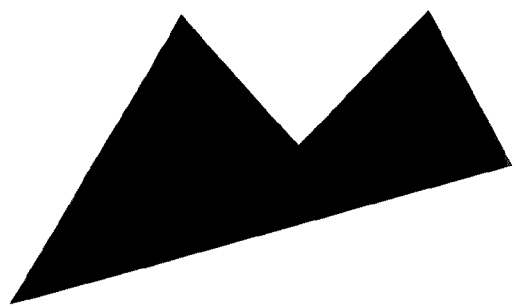
FIG. 14 is a view describing graphics-rendering operation for each scan line.
Figure 15:
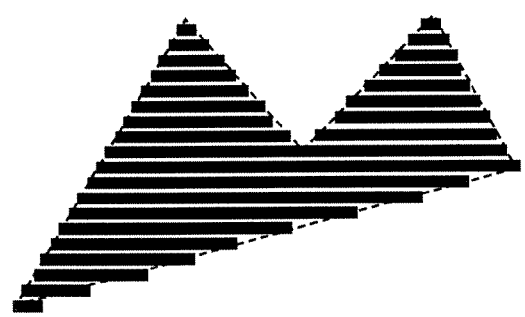
FIG. 15 is a view describing graphics-rendering operation for each scan line.

For instance, a polygonal graphic object such as that shown in FIG. 14 is available. When rendering of this graphic object is conceived, the graphic object can be rendered by means of dividing the graphic object into lines to be rendered on a per-scan-line basis, as shown in FIG. 15. FIG. 15 is slightly exaggerated for the purpose of illustration. Lines are separated for the sake of convenience and illustration. In reality, the lines are accurately rendered with pixels.

Figure 16:
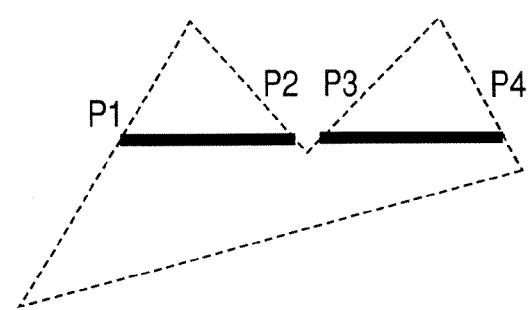
FIG. 16 is a view describing graphics-rendering operation for each scan line.

Consideration is given to a portion of a "y" coordinate corresponding to one scan line shown in FIG. 16. Rendering of a polygonal graphic object can be understood to be replaced with rendering of a plurality of lines (rendering of two lines in the case of FIG. 16). Rendering of a line requires only the starting point and the end point used for rendering a line. Namely, it is understood that a graphic object can be rendered, so long as only information about points P1, P2, P3, and P4 in FIG. 16 is available.

Points P1 and P3 in FIG. 16 are starting points used for rendering a line, and hence are hereinafter called line IN points P2 and P4 are end points used for rendering a line, and hence hereinafter are called line OUT points.

When graphics rendering for each scan line is conceived, it can be said that computing the line IN point and the line OUT point is preferable.

Determination of the Line IN Point and the Line OUT Point of a Target Point from a Result of Determination of Both Points Through use of the result of a determination made as to whether the two points; namely, the point Pleft $(x-1, y)$ and the point Pright $(x+1, y)$ are located on respective sides of the target point $(x, y)$ determined by the target point determination unit 6, a determination is made as to whether the target point is the line IN point, the line OUT point, or some other point.

The determination about both points assume four possible results provided below:

(1) Both points are false; namely, (blank)*(blank)

(2) The left point is true, but the right point is false; namely, (filled)*(blank)

(3) The left point is false, but the right point is true; namely, (blank)*(filled)

(4) Both points are true; namely, (filled)*(filled), where reference symbol * denotes a point of interest $(x, y)$. Further, symbol (blank) denotes an area which is not filled in, and symbol (filled) denotes an area to be filled in.

Processing for filling in a polygonal graphic object is conceived in each scan line including a target point.

In the case of (1), both points (both Pleft and Pright) are areas not to be filled in. Accordingly, a target point * is a point which is not involved in fill-in operation in a scan line. Specifically, the target point is neither the line IN point nor the line OUT point.

In the case of (2), the left side (Pleft) of the target point * is an area to be filled in, and the right side (Pright) of the target point * is an area not to be filled in. Accordingly, the target point * can be deemed as an end point of the area to be filled in that line; namely, the line OUT point. Specifically, the area to be filled in starts from a point which is located on the left side of the target point *, and the target point * serves as the end point of the area to be filled in.

In the case of (3), the left side (Pleft) of the target point * is an area not to be filled in, and the right side (Pright) of the same is an area to be filled in. Accordingly, the target point * can be deemed as a starting point of an area to be filled in the line; namely, the line IN point. Specifically, the area to be filled in starts from the target point *, and any point located on the right side of the target point * serves as the end point of the area to be filled in.

In the case of (4), since the points (Pleft and Pright) located on both sides of the target point * are areas to be filled in, the target point * can be deemed as a point included in an area to be filled in. Specifically, the area to be filled in starts from any point located on the left side of the target point *, and any point located on the right side of the target point * serves as an end point of the area to be filled in. Specifically, the target point can be said to be neither the line IN point nor the line OUT point.

After the determination is made, the target point management unit 4 is notified that the process for computing the fill-in information is finished.

Output of Computed Fill-In Information

As mentioned previously, the fill-in information computing unit 7 acquires information about fill-in of a target point; namely, information that the target point [coordinates $(x1, y1)$] is any of (1) the line IN point, (2) the line OUT point, and (3) some other point in a certain scan line (a scan line where $y=y1$ is achieved). This information is output to the fill-in information registration unit 8 to be described later.

Fill-in Information Registration Unit

The fill-in information registration unit 8 will now be described.

The fill-in information registration unit 8 is for registering into the fill-in information storage area 9 fill-in information about the target point to be processed acquired by the fill-in information computing unit 7.

Descriptions of the Fill-in Information Storage Area

The fill-in information storage area 9 is arbitrary storage unit for retaining fill-in information. For instance, the fill-in information storage area 9 is formed in an internal memory incorporated in an apparatus which implements the embodiment.

However, the fill-in information storage area 9 is not limited to the internal memory. Arbitrary means can be used, so long as the means can retain fill-in information. Moreover, the fill-in information storage area 9 is not limited to a location within an apparatus which implements the embodiment, and may also be a removable memory device (USB memory equipment, an SD memory card, or the like), a magnetic storage medium (a CD-R, a DVD-R, or the like), a storage device (an NAS device, a HDD incorporated in another piece equipment, or the like) connected via arbitrary communications means (a wired LAN, a wireless LAN, communication using a portable telephone such as W-CDMA, or the like), or the like.

The fill-in information to be registered in the fill-in information storage area 9 is typically that coordinates of the target point correspond to any of (1) the line IN point, (2) the line OUT point, and (3) some other point. However, the fill-in information is not limited to them, and arbitrary information including at least the above information may also be registered.

Various storage methods employed for the fill-in information storage area 9 are conceivable. Although one of the methods will be hereinbelow described, the method is a mere example, and the present invention is not limited to this method.

FIG. 17 shows an example storage method used for the fill-in information storage area 9. The method shown in FIG. 17 shows an example where a stack (a variable area), which can store two points; namely, the line IN point and the line OUT point, is prepared for each of the scan lines, and where stacks for all of the scan lines (1080 lines) are prepared.

The stacks for all of the scan lines show the total number of scan lines in an area desired to be finally rendered. For instance, in the case of a rendering area of a full HDTV, a 1920×1080 resolution is achieved. Accordingly, stacks for 1080 lines are prepared.

In each stack, the "x" coordinate of the point determined to be the line IN point and the "x" coordinate of the point determined to be the line OUT point are stored. In FIG. 17, xi##(n) denotes the stored "x" coordinate of the point determined to be the line IN point of a scan line ##, and xo##(n) denotes the stored "x" coordinate of the point determined to be the line OUT point of the scan line ##.

Operation of the Fill-in Information Registration Unit

For instance, when fill-in information indicating that a target point [a point where a target point assumes coordinates (xs, 1078)] assigned scan line number 1078 is the line IN has been received from the fill-in information computing unit 7, the fill-in information registration unit 8 registers the information into the fill-in information storage area 9. In the case shown in FIG. 17, n+1 information items up to xi1078(n) have already been registered in the stack of the line IN point assigned scan line number 1078; and hence the value of xs, which is the "x" coordinate of the target point, is registered as the n+2th information item at the end of the registered information.

Although the example registration method is illustrated in the above, the method is not limited to this example. The example is a mere embodiment, and a registration method other than that may also be employed. Although an example in which the "x" coordinate of the target value is added to the end of the registered information has been described, the "x" coordinate of the target point may also be added to the head of the registered information or registered in an arbitrary position under arbitrary conditions (e.g., in ascending order of coordinates).

Rendering Area Computing Unit

Next, the rendering area computing unit 10 will be described.

The rendering area computing unit 10 is for computing information about an area where a graphic object is to be rendered, from data pertaining to a target vector to be processed acquired from the vector data extraction unit 2.

Figure 18:
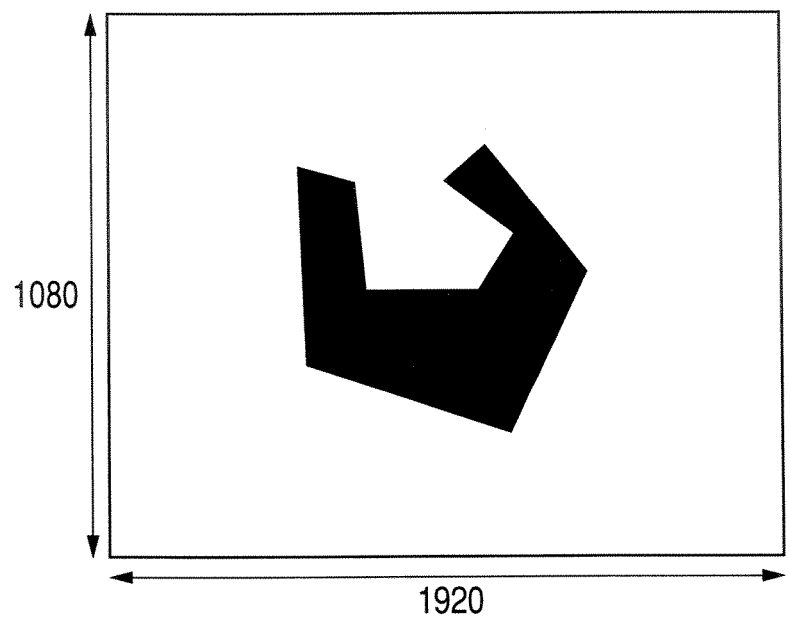
FIG. 18 is a view describing a rendering area.
Figure 19:
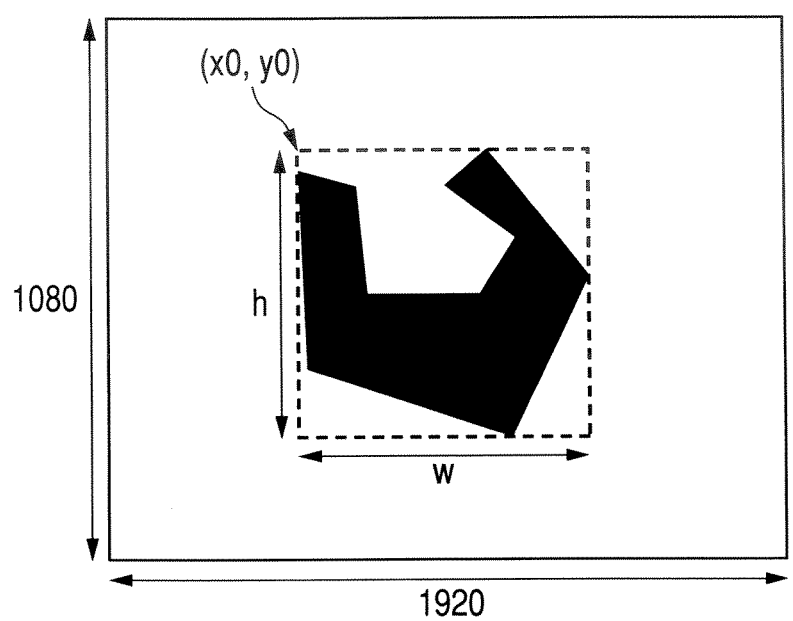
FIG. 19 is a view describing a rendering area.

For instance, when the range of a screen for displaying a rendered graphic object assumes a 1920×1080 resolution, a maximum area of 1920×1080 is required as a rendering area. However, in normal times, an area where a polygonal graphic object is actually present is a partial area in the 1920×1008 area. For example, in the case shown in FIG. 18, a graphic object exists in only the center of the 1920×1080 area. In this case, as shown in FIG. 19, since a graphic object is present only in the minimum rectangular area [an area extends from coordinates (x0, y0) to a height "h" and a width "w"] encompassing the graphic object, the essential requirement is to define only this rectangular area as an area where the graphic object is to be rendered. As a result, the rendering area can be limited as compared with the case where the entire screen is taken as a rendering area, and an increase in rendering speed can be expected.

The rendering area computing unit 10 is provided for such a purpose; and computes information about the minimum rectangular area including the data pertaining to the target vector to be processed extracted by the vector data extraction unit 2, and updates the graphics-rendering area information on the basis of the thus-computed minimum rectangular area.

Figure 20:
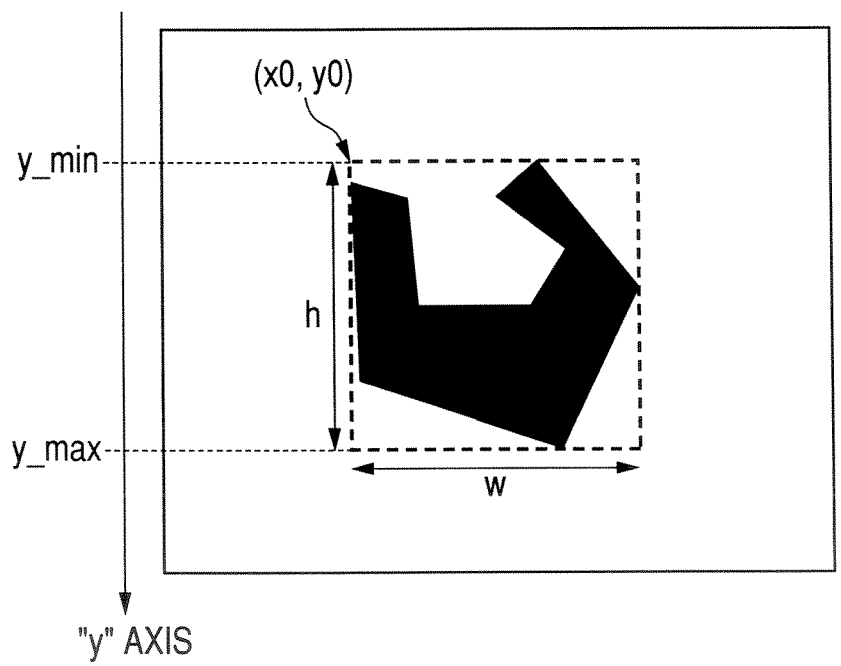
FIG. 20 is a view describing a rendering area.

As has been described in connection with the embodiment, when the vertical direction (the direction of the "y" axis) is taken as a reference, graphics-rendering operation is performed on the per-scan-line basis in the direction of the "y" axis. Accordingly, among the pieces of information about the minimum rectangles included in the graphic object, only the data pertaining to the minimum rectangle in the direction of the "y" axis become important. Namely, only the lower limit of the rectangular area in the direction of the "y" axis (y0 in FIG. 19) and the upper limit of the rectangular area in the direction of the "y" axis (y0+h in FIG. 19) are important. The rendering area computing unit 10 computes the lower limit (hereinafter called a y_min) and the upper limit (hereinafter called a y_max) (FIG. 20).

Figure 21:
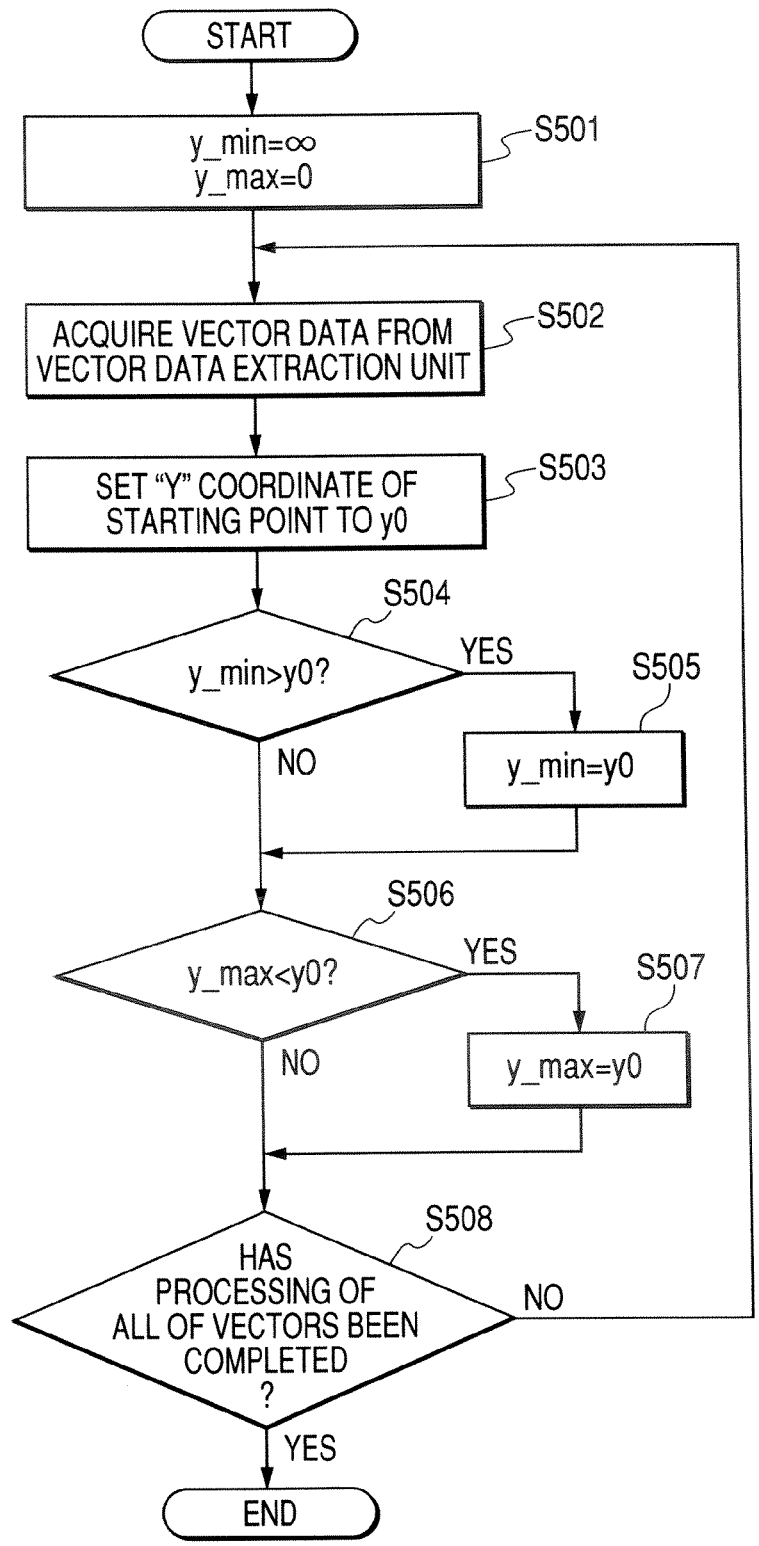
FIG. 21 is a computation flowchart.

FIG. 21 shows a computation flowchart. In step S501, an initial value of y_min and an initial value of y_max are set. In step S502, vector data extracted by the vector data extraction unit 2 are acquired. Next, in step S503, the "y" coordinate of the start of the vector is set to y0. In step S504, a determination is made as to whether or not a relationship of y_min>y0 is true. When the relationship is true, processing proceeds to step 505. In step S505, the value of y0 is set on y_min, and processing proceeds to step S506. In contrast, when the relationship is false, processing proceeds directly to S506. Likewise, in step S506, a determination is made as to whether or not a relationship of y_max<y0 is true. When the relationship is true, y0 is set on y_max in step S507, and processing proceeds to step S508. In contrast, when the relationship is false, processing proceeds directly to step S508. In step S508, a determination is made as to whether or not processing pertaining to all vectors has been completed. When the relationship is false, processing returns to step S502. When the relationship is true, processing ends. Thereby, the value of y_min and the value of y_max can be obtained.

The above descriptions are directed to a mere embodiment, and the present invention is not limited to this embodiment. The upper limit and the lower limit of the "y" coordinate of the graphic object to be rendered may also be computed by use of another method.

In the above descriptions, only the "y" coordinate is computed. However, the present invention is not limited to this embodiment. Information about the "x" coordinate is computed by similar means, and the information about the "x" coordinate may be output along with the "y" coordinate. Any format of expression, such as a lower limit and the height of an area, may be adopted rather than the information about the "x" coordinate being output as the upper limit and the lower limit, so long as the format is equal to the upper limit and the lower limit in terms of the volume of information.

Rendering Area Correction Unit

Next, the rendering area correction unit 11 will be described.

The rendering area correction unit 11 is for making corrections to the rendering area information computed by the rendering area computing unit 10. The entire graphic object formed from a vector data group, which are to become inputs, does not inevitably fall within the rendering area.

Figure 22:
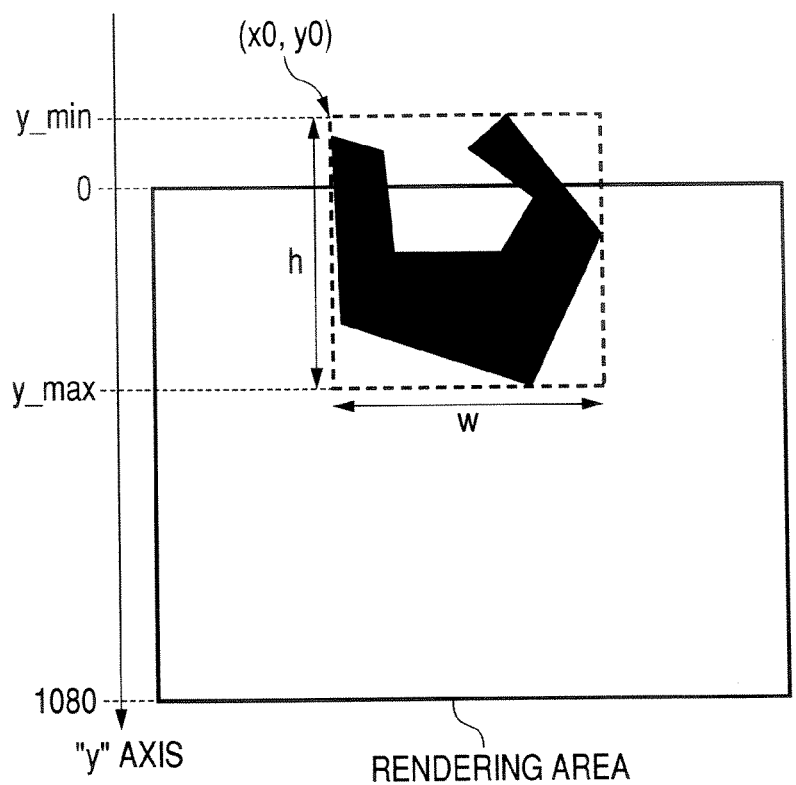
FIG. 22 is a view describing corrections to the rendering area.

FIG. 22 shows this example. FIG. 22 shows an example where a portion of a graphic object falls outside a rendering area. In this case, y_min<0 is achieved, this portion of the graphic object is not rendered. At this time, the relationship must be corrected to y_min=0. The rendering area correction unit 11 makes such corrections.

Specifically, when y_min<0, y_min=0 is assumed to be achieved. In a case where there is achieved a relationship of the upper limit (1080 in an example shown in FIG. 22) of the "y" coordinate of a rendering area≤y_max, a correction is made such that there is attained a relationship of the upper limit of the "y" coordinate of the rendering area=y_max.

Rendering Data Correction Unit

The rendering data correction unit 12 will now be described.

Upon receipt, from the vector data group management unit 1, of the notification that processing of the vector data group has been completed, the rendering data correction unit 12 functions to read information which is used for rendering and is stored in the fill-in information storage area 9, and to make a correction such that the information becomes data appropriate for rendering by the rendering unit 13 to be described later.

As shown in FIG. 17, at the time of receipt, from the vector data group management unit 1, of the notification that processing of the vector data group has been completed, fill-in information about the line IN point and the line CUT point is acquired with regard to points (pixels) included in all of the vectors forming a graphic object desired to be rendered.

However, when the method described in connection with the fill-in information registration unit 8 is used, a vector is piled from the head of a stack in sequence of processing of a vector. Therefore, variation arises in the sequence of appearance of a vector. This leads to deteriorated efficiency when consideration is given to cost incurred by rendering a line.

Figure 23:
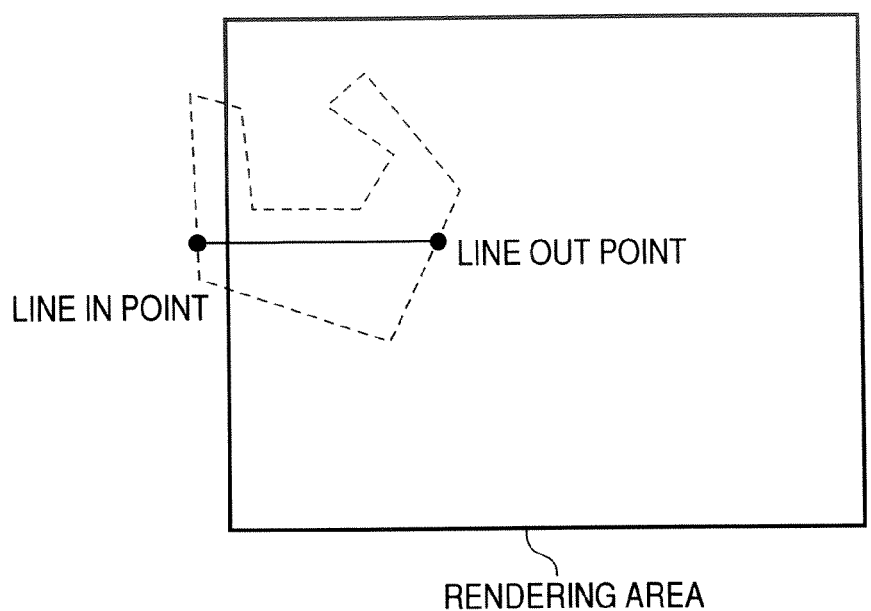
FIG. 23 is a view describing corrections to rendering data.

When a portion of the graphic object desired to be rendered falls outside the rendering area, there may arise a case where the line IN point or the line OUT point falls outside the rendering area (FIG. 23). In this case, rendering of a line from the line IN point to the left end of the rendering area is not reflected on an actual rendering area and, hence, is useless. This results in a reduction in the speed of the graphics-rendering apparatus.

When the shape of the graphic object is complicated, there is a case where a plurality of vectors pass through the same line IN and OUT points, and hence an overlap may arise in data. In this case, rendering the same line a plurality of times is wasteful. Areas of straight lines, each line being expressed by a pair consisting of a line IN point and a line OUT point, often cross each other. In this case, a plurality of straight lines can be collected into a single straight line. As a result, the number of times a straight line is rendered can be curtailed, which in turn leads to a speedup.

The rendering data correction unit 12 is for solving these problems and performs the followings:

1. Sort the line IN points and the line OUT points in ascending sequence (or descending sequence).
2. Correct data falling outside of a rendering area to the edge of the rendering area. Specifically, when the "x" coordinate of the line IN point and the "x" coordinate of the line OUT point assume negative values, the "x" coordinates are corrected to 0. When exceeding the width of the rendering area, the "x" coordinates are corrected to the width of the rendering area. Preferably, when falling outside the range of a rendering area, both a corresponding line IN point and a corresponding line OUT point are deleted from the stack as unwanted data.
3. Delete data pertaining to the redundant line IN points and the redundant line OUT points. Specifically, when an overlap exists among data pertaining to the line IN point and the line OUT point, delete the overlap. Preferably, when there are data which form a plurality of straight lines to be included in a straight line formed by data pertaining to a pair consisting of a line IN point and a line OUT point, delete the data forming the straight lines which are to be included.

In relation to corrected data, straight lines (lines) are merely rendered while a line IN point and a line OUT point, which are located at the same position with reference to the head, are taken as corresponding points. As a result, an area forming a portion of the graphic object desired to be rendered, which falls within the range of rendering, in the target scan line is sequentially rendered from the left of the screen.

Rendering Unit

The rendering unit 13 will now be described.

The rendering unit 13 is for rendering the rendering data acquired from the rendering data correction unit 12 by means of rendering a straight line (line) on a per-scan-line basis. At this time, the range of rendering operation is limited by use of the information about the range of rendering (specifically, a rendering-start scan line and a rendering-end scan line) acquired from the rendering area correction unit 11, thereby speeding up rendering operation.

Figure 24:
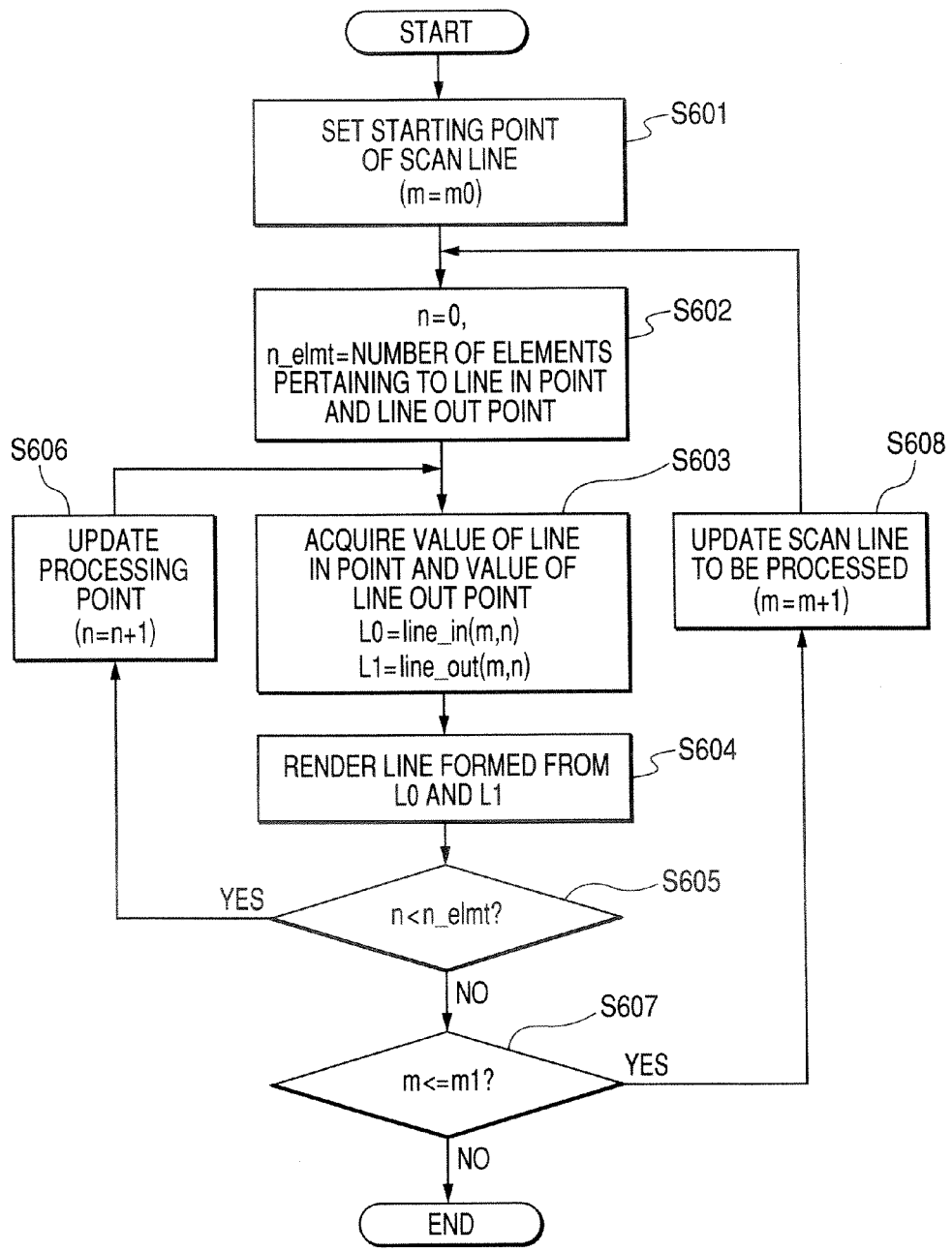
FIG. 24 is a processing flowchart of a rendering unit.

FIG. 24 shows a processing flowchart of the rendering unit 13.

The n-th line IN data pertaining to a scan line number "m" are taken as line_in (m, n), and the line OUT data are taken as line_out(m, n). The number of elements of the data included in the scan line number "m" is taken as n_element. Further, the rendering start scan line number acquired from the rendering area correction unit 11 is set as m0, and the end scan line number is set as m1.

First, in step S601, m0 is set as a number assigned to a scan line which is a target of rendering. Next, in step S602, the number "n" assigned to target data to be processed is initialized, and the number of elements n_elmt is computed. Next, in step S603, the value of L0=line_in(m,n), L1=line_out(m,n) is acquired. In step S604, a line (straight line) formed from L0, L1 is actually rendered. As a result, a straight line having L0, L1 as both ends thereof is rendered. In step S605, a determination is made as to whether or not rendering of all of the elements has been completed. When rendering of all of the elements has not yet been finished, rendered points are updated (to n=n+1) in step S606, and processing returns to step S603. When rendering of all of the elements has been completed, processing proceeds to step S607. In step S607, a determination is made as to whether or not rendering of scan lines up to the scan line m1 that has finished undergoing rendering. When rendering operation has not been completed, rendered scan lines are updated (to m=m+1), and processing returns to step S602. When rendering of scan lines up to the scan line m1 has already been completed, processing is terminated.

HW (hard ware) specifically designed for rendering a line may be used for actually rendering a line, or a general-purpose graphics rendering LSI (GPU; Graphics Processing Unit) or the like may also be used. Alternatively, actual rendering of lines may also be performed in the manner of software by use of another means.

As described above, rendering is consecutively performed on a per-scan-line basis as shown in FIG. 15. Finally, rendering of a polygonal graphic object such as that shown in FIG. 14 is completed.

The method described above is only one mode of the embodiment, and the method is not limited to this method.

Advantages Yielded by the Embodiment

According to the embodiment of the present invention, rendering operation is not complicated in association with the degree of complication of a graphic object formed from a group of sets of input vector data. For instance, in the rendering method using triangulation (see Non-Patent Document 2), when complicated self-intersections are present in an input graphic object, there is a necessity for dividing the input graphic object into a group of simple polygons formed from a single closed loop. For this reason, on the dependence of complication of the graphic object, dividing operation is applied a very large number of times, which makes subsequent processing operation complicated. This can be one great factor for a malfunction (a bug). When an input graphic object has become very complicated, there may be an input of unexpected shape. The above-described dividing operation may not operate well at that time. Namely, the method which entails an increase in the amount of processing in proportion to the complication of the graphic object can be said to be devoid of stability. Meanwhile, according to the embodiment of the present invention, processing is performed on a per-vector-data basis. Processing specifics are not dependent on the shape of a graphic object. Therefore, the amount of processing does not increase in proportion to the complication of a graphic object. Therefore, the method of the embodiment of the present invention can be said to be very stable.

According to the method of the embodiment of the present invention, the only requirement is to store only the group of sets of data pertaining to the line IN points and the line OUT points before rendering operation is performed. This requires only a very small volume of data, and the amount of memory used is small. Meanwhile, the triangulation method requires various pre-processing operations (see the related-art document 2 for details) before rendering operation. Therefore, a very large volume of intermediate data must be stored Rendering operation is also performed on a per-triangle basis, and hence the amount of memory used becomes larger than the amount of memory required by the method of the embodiment of the present invention in which rendering is performed on a per-line basis. The method (described in, for example, the related-art document 3) using a stencil buffer requires a special memory area called a stencil buffer for performing rendering operation. The stencil buffer basically requires an area equal to the rendering area. Moreover, rendering operation itself is performed on a per-screen basis, and hence a very large volume of memory must be used. From the viewpoint of the volume of memory used, the method described in the embodiment of the present invention yields a greater advantage than do the related-art methods mentioned above.

The method described in connection with the embodiment requires preparation of only an apparatus capable of rendering lines as rendering operation. Therefore, a complicated custom-designed circuit is not required, and the present invention can be embodied by use of a simple circuit or a general-purpose graphics LSI. From this viewpoint, there is yielded a great advantage in relation to available resources.

The method described in connection with the embodiment of the present invention enables graphics rendering at higher speed than do a point-based method and a related-art scan-line-based method, by means of adoption of the configuration mentioned above.

From the above descriptions, according to the method of the embodiment of the present invention, there can be provided a graphics-rendering apparatus and a graphics-rendering method, which resolve drawbacks in the related-art methods, such as difficulty in the use of a method with small amounts of resources, lack of stability, and lack of a high-speed characteristic and which enable high-speed and stable operation under circumstances where only a few resources or a small amount of memory are available.

First Modification of the Embodiment

Figure 25:
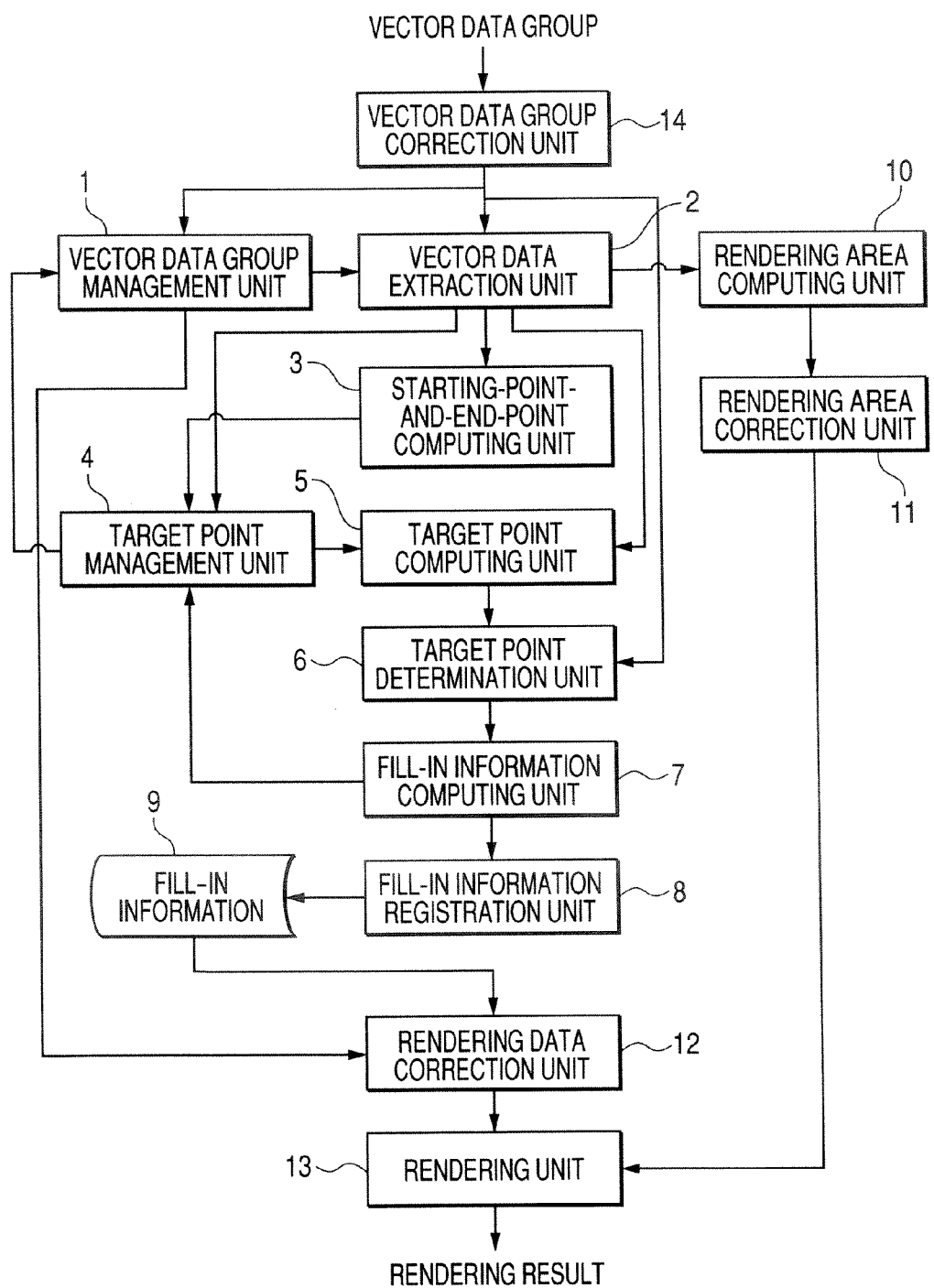
FIG. 25 is a view for schematically showing an example configuration of a graphics-rendering apparatus according to a first modification of the embodiment of the present invention.

FIG. 25 shows an overall block diagram of a graphics-rendering apparatus according to a first modification of the embodiment of the present invention. The first modification of the embodiment of the present invention is embodied by addition of a vector data group correction unit 14 to the embodiment.

Vector Data Group Correction Unit

The vector data group correction unit 14 will be described. The vector data group correction unit 14 is for correcting an input vector data group.

When data pertaining to a zero vector are included in the vector data group, the data can be eliminated.

When two or more continual vectors are aligned in the same direction; namely, the following relationship stands, these vectors can be merged into a single vector.

$$V(n)/|V(n)|=V(n+1)/|V(n+1)|=\ldots=V(n+m)/|V(n+m)|$$

where m=1, 2, ...

Specifically, the end point of V(n) is replaced with the end point of V(n+m) in the above relationship, and data pertaining to V(n1), ..., V(n+m) can be deleted.

Even when continual vectors are aligned in the opposite direction, the vectors can be merged in the same manner. New both ends of a vector into which the continual vectors are merged are computed, and V(n) is replaced with that new vector. The other vectors that have been merged can be deleted.

The vector data group correction unit 14 performs a correction to the vector data group having such a redundant expression. By means of the correction, the total number of groups of sets of vector data can be diminished, which in turn leads to an increase in speed of subsequent processing.

The example redundant expression has been described thus far. However, the redundant expression is not limited to that mentioned above. There can be used all of the modifications that enable a reduction in the total number of vector data groups without involvement of a modification to the shape of a polygonal graphic object formed from the vector data group.

In connection with subsequent processing of the first modification of the embodiment in the present invention, the description in the embodiment stating the vector data group which are inputs is replaced, as required, with a description stating the vector data group corrected by the vector data group correction unit 14

Operations other than the operation described above are the same as the operations in the embodiment.

Second Modification of the Embodiment

Figure 26:
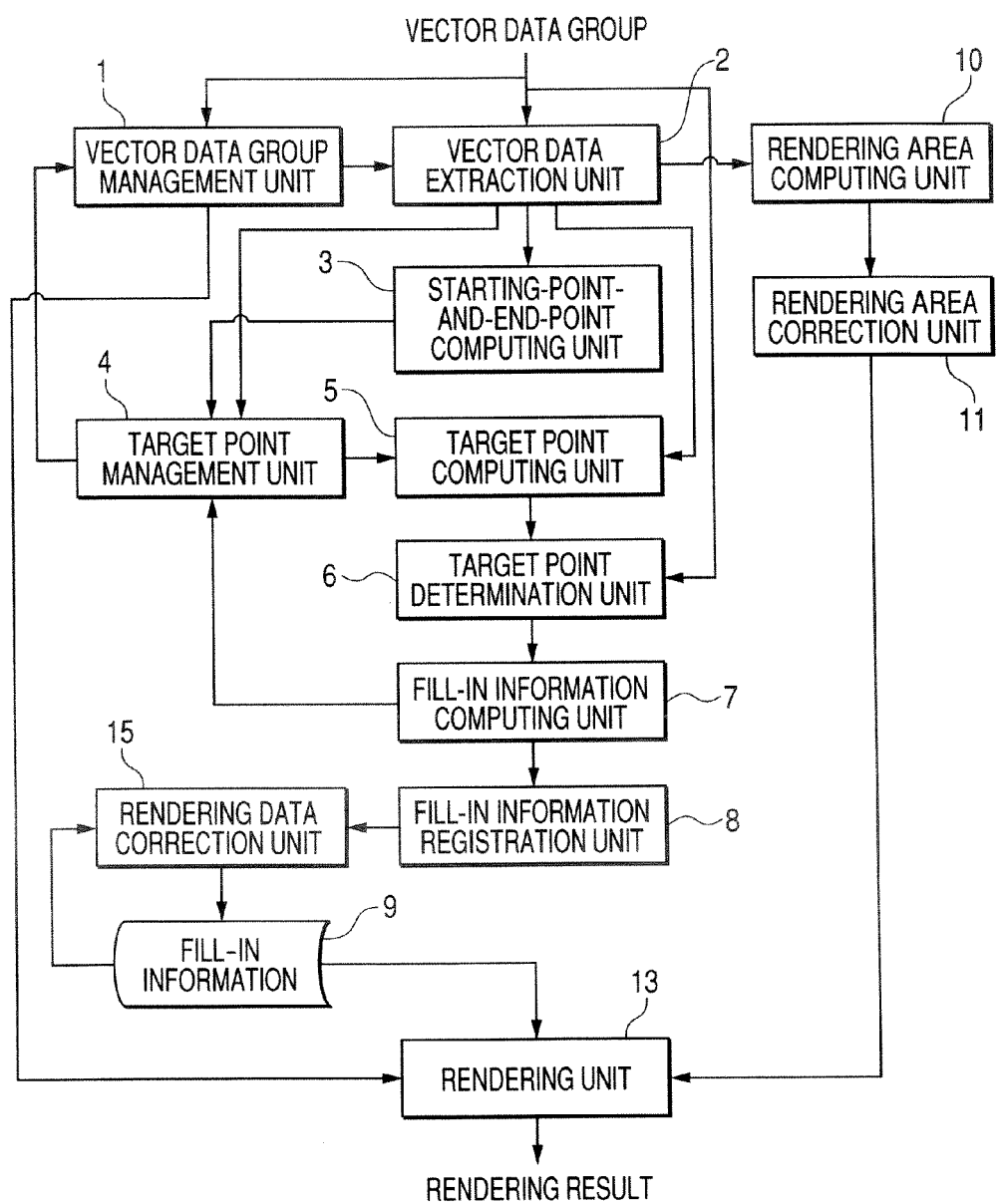
FIG. 26 is a view for schematically showing an example configuration of a graphics-rendering apparatus according to a second modification of the embodiment of the present invention.

FIG. 26 shows an overall block diagram of a graphics-rendering apparatus according to a second modification of the embodiment of the present invention.

The second modification of the embodiment of the present invention is embodied by addition of a new rendering data correction unit 15 in lieu of the rendering data correction unit 12 of the graphics-rendering apparatus of the embodiment, wherein the data in the fill-in information storage area 9 are updated by means of consecutively making corrections to the registration information acquired by the fill-in information registration unit 8 through use of the data stored in the fill-in information storage area 9. The sections connected to the rendering data correction unit 12 of the graphics-rendering apparatus of the embodiment are connected directly to the rendering unit 13.

Operation of the rendering data correction unit 15 is basically identical with the operation of the rendering data correction unit 12 in the graphics-rendering apparatus of the embodiment. A difference between the rendering data correction units 12 and 15 lies in that the rendering data correction unit 12 of the graphics-rendering apparatus of the embodiment makes corrections to the data stored in the fill-in information storage area 9 whilst the rendering data correction unit 15 accumulates the registration information acquired by the fill-in information registration unit 8 while making corrections to the registration information; namely, stores registration data into the fill-in information storage area 9 while consecutively making corrections to the registration data (concurrently, the data having already accumulated in the fill-in information storage area 9 are also updated).

Upon receipt of the notification pertaining to completion of processing of the vector data group from the vector data group management unit 1, the rendering unit 13 starts processing. Except of this point, the rendering unit 13 is completely identical with its counterpart of the embodiment.

Third Modification of the Embodiment

Figure 27:
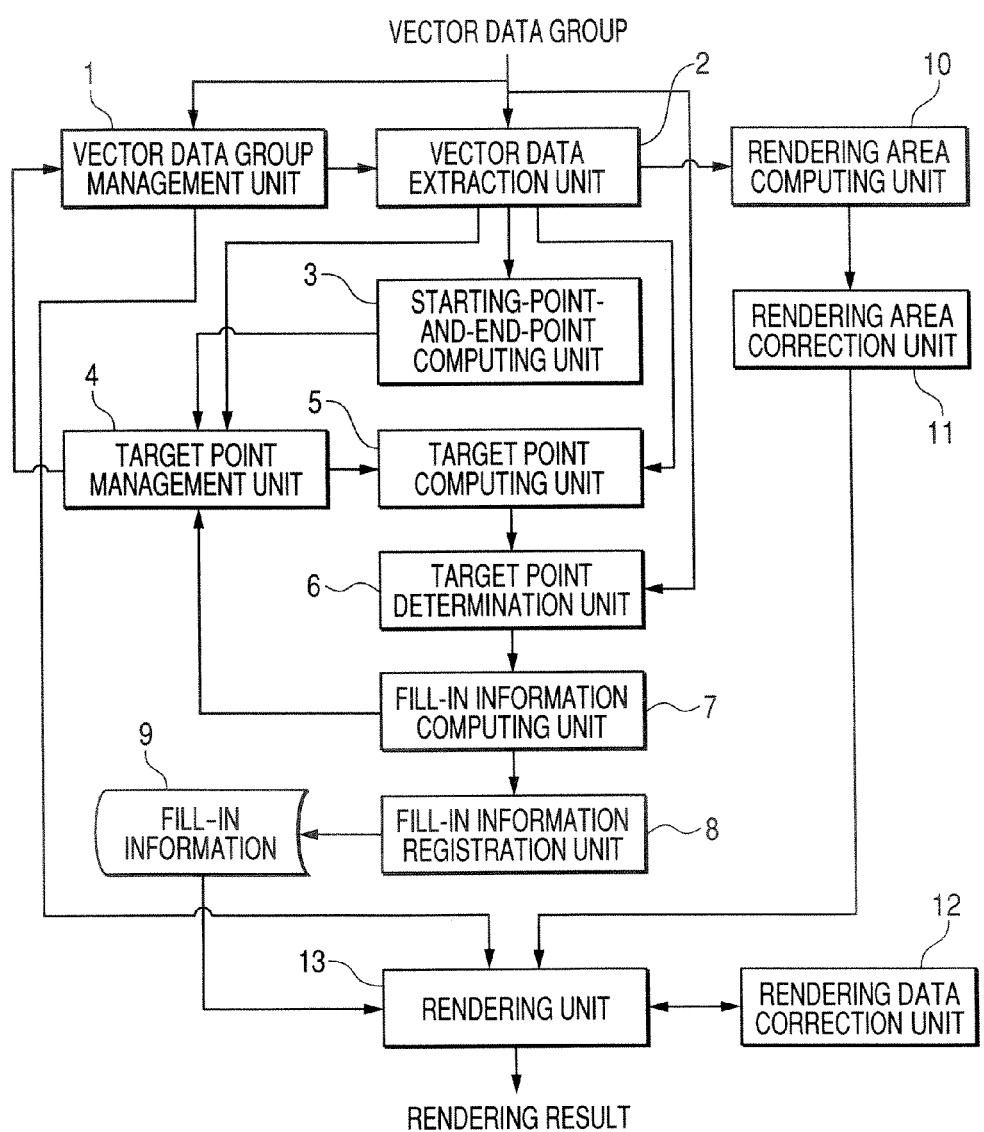
FIG. 27 is a view for schematically showing an example configuration of a graphics-rendering apparatus according to a third modification of the embodiment of the present invention.

FIG. 27 shows an overall block diagram of a graphics-rendering apparatus according to a third modification of the embodiment of the present invention.

A difference between the third modification and the embodiment lies in that the rendering data correction unit 12 is connected solely to the rendering unit 13 rather than being interposed between the fill-in information storage area 9 and the rendering unit 13.

In this case, the rendering data correction unit 12 is invoked as pre-preprocessing before processing of each of scan lines. The rendering data correction unit 12 makes corrections to the data pertaining to a target scan line. The rendering unit 13 again receives a result of correction, and processing is continuously performed. Specifically, it is better to perform the above processing operations before processing pertaining to step S603 in FIG. 24. The correction method performed by the rendering data correction unit 12 is completely identical with the descriptions of the embodiment.

A difference between the third modification and the embodiment lies in that sequential processing, such as "Correction of All of the sets of Data"→"Rendering of all of the Sets of Data," is employed in the embodiment whereas operations "Correction of Data"→"Rendering" are repeated for each scan line in the third modification.

Fourth Modification of the Embodiment

Figure 28:
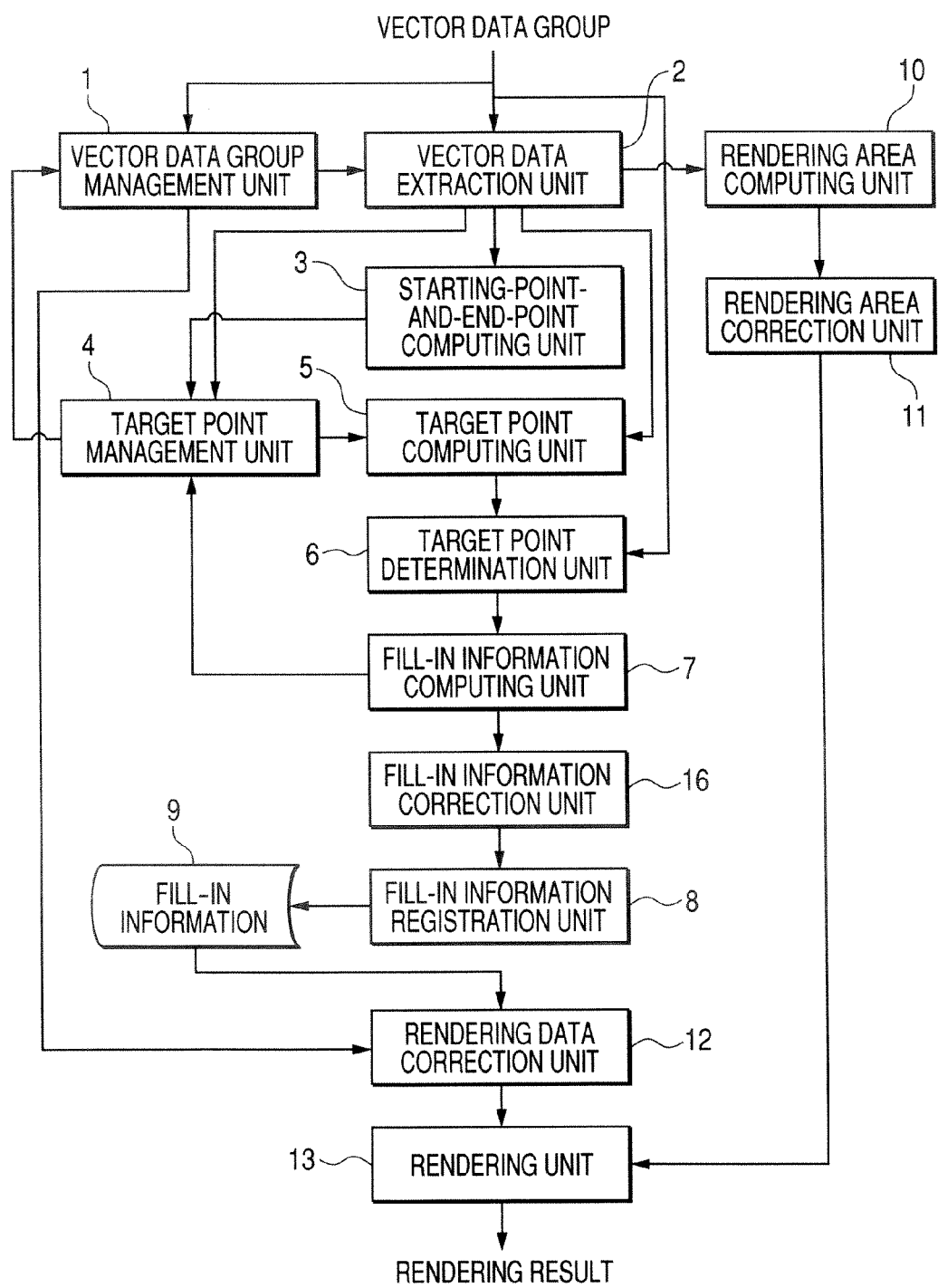
FIG. 28 is a view for schematically showing an example configuration of a graphics-rendering apparatus according to a fourth modification of the embodiment of the present invention.

FIG. 28 shows an overall block diagram of a graphics-rendering apparatus according to a four modification of the embodiment of the present invention.

A fill-in information correction unit 16 is newly added between the fill-in information computing unit 7 and the fill-in information registration unit 8, both of which are shown in FIG. 1 and pertain to the embodiment.

The fill-in information correction unit 16 is for making corrections to the fill-in information about a target point to be processed acquired by the fill-in information computing unit 7, and passing the thus-corrected fill-in information to the fill-in information registration unit 8.

Figure 29:
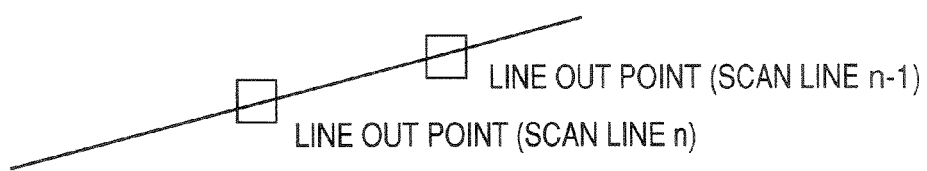
FIG. 29 is a view describing corrections to fill-in information.
Figure 30:
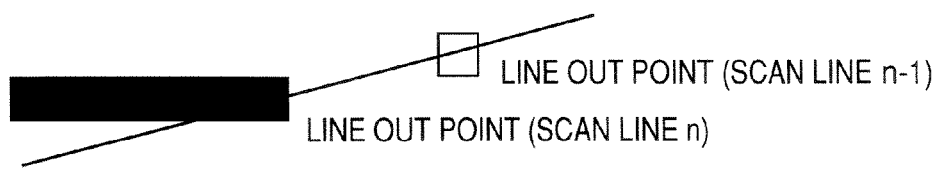
FIG. 30 is a view describing corrections to fill-in information.
Figure 31:
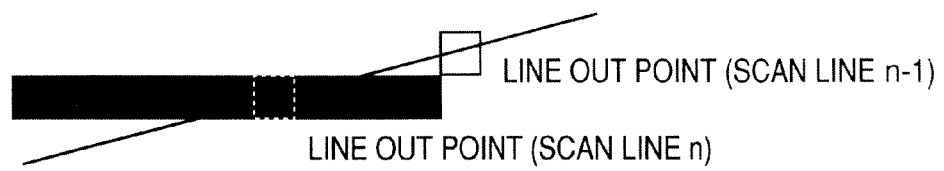
FIG. 31 is a view describing corrections to fill-in information.

Specifically, the fill-in information correction unit 16 makes corrections to the position of the line IN point and the position of the line OUT point. For instance, a line OUT point such as that shown in FIG. 29 is assumed to be acquired in relation to a certain vector. In this case, a plurality of filling methods are conceivable as in the case of a method of taking the area of a scan line up to a line OUT point thereof as an area of a graphic object to be filled in as shown in FIG. 30 and another method of taking an area up to a point located before a line OUT point of a scan line (n−1) as an area to be filled in as shown in FIG. 31.

The filling method changes according to a rule of rendering the margin of a polygon when a polygonal graphic object is rendered. In accordance with this rendering rule, the fill-in information correction unit 16 makes corrections to the coordinates of the line IN point and the coordinates of the line OUT point, which are target points to be processed and acquired by the fill-in information computing unit 7.

The correction method changes according to the rendering rule. However, in the case of the example shown in FIG. 30, coordinates are computed through use of information about upper and lower scan lines. Which one of the upper and lower scan lines is used is determined by the direction of a vector.

The fill-in information correction unit 16 passes corrected data pertaining to the line IN point and the line OUT point to the fill-in information registration unit 8. The fill-in information registration unit 8 continually performs processing in the same manner as described in connection with the embodiment.

Although the example correction methods have been described, the present invention is not limited to these methods Processing is performed by use of an arbitrary correction method which complies with a rendering rule. The embodiments and the modifications thereof can be implemented in combination, as required.

Processing pertaining to the embodiments of the present invention is realized as a program which can be executed by a computer, and the program can also be embodied as a computer-readable storage medium.

The storage medium of the present invention employs any storage format such as a magnetic disk, a floppy (registered trademark) disk, a hard disk drive, an optical disk (a CD-ROM, a CD-R, a DVD, and the like), a magneto-optical disk (an MO and the like), semiconductor memory, and the like, so long as the storage medium can store a program and can be read by a computer or a built-in system.

An OS (Operating System) which runs on a computer in accordance with a command from a program installed in a computer or a built-in system from a storage medium; or MW (middle ware) such as database management software, a network and the like, may perform portions of processing operations of the embodiments.

The storage medium of the present invention is not limited to the medium that is independent of a computer or a built-in system, but includes storage mediums into which a program transmitted over a LAN, the Internet, and the like and downloaded is stored or temporarily stored.

The number of storage mediums is not limited to one. Even when processing pertaining to the embodiment is executed by a plurality of mediums, the storage mediums fall within the scope of the storage medium of the present invention, and the medium may employ any configuration.

The computer or the built-in system of the present invention is for performing various processing operations of the embodiments in accordance with a program stored in the storage medium; and may be of any configuration, such as an apparatus formed from any one of a personal computer, a microcomputer, and the like, or a system into which a plurality of pieces of apparatus are connected by way of a network, and the like.

The computer of the present invention is not limited to a personal computer, but also includes a computing device, a microcomputer, and the like, which are built into information equipment. Equipment and devices, which enable implementation of the present invention by means of a program, are generically called a computer.

The present invention is not limited to the embodiments, and is susceptible to various forms in an embodiment stage within the scope of the invention. Further, the above embodiments encompass inventions in various stages. Various inventions can be extracted by means of appropriate combinations of the plurality of constituent elements. For instance, even when some constituent elements have been deleted from all of the constituent elements described in the embodiments, (at least one of) the problems described in connection with the problem to be solved by the present invention can be solved. When (at least one of) the advantages described in connection with the advantages of the invention are yielded, the configuration from which the constituent elements have been deleted can be extracted as the present invention.

As described above in detail with reference to the embodiment, there is provided an apparatus and a method for stably rendering a polygonal graphic object at high speed with low consumption of memory space.

What is claimed is:

1. A graphics-rendering apparatus comprising:
a vector data group management unit that manages a vector data group including sets of vector data forming a polygon based on first management information;
a vector data extraction unit that extracts vector data as a target vector to be processed from the vector data group in accordance with the first management information;
a starting-point-and-end-point computing unit that computes starting-point-and-end-point information that indicates starting and end points of the processing, based on the vector extracted by the vector data extraction unit;
a target point management unit that generates a second management information for managing a target point by determining the target point to be processed in accordance with the starting-point-and-end-point information, and notifies the vector data group management unit of completion of processing of the target vector;
a target point computing unit that computes coordinates of a pixel of the target point to be processed, based on the second management information;
a target point determination unit that determines whether or not to fill in each of pixels positioned at both sides of the coordinates of the pixel of the target point to be processed by examining a vector of the vector data set forming the polygon and considering (i) positional relations of the pixel of the target point relative to the examined vector, and (ii) whether the examined vector changes from right to left or from left to right;
a fill-in information computing unit that computes fill-in information regarding the target point based on the determination result of the target point determination unit and predefined rules for filling in a closed area of the polygon;
a fill-in information storage unit that stores the fill-in information;
a fill-in information registration unit that registers into the fill-in information storage unit the fill-in information computed by the fill-in information computing unit;
a rendering area computing unit that computes and updates a rendering area where the polygon is to be rendered, based on the vector data extracted by the vector data extraction unit;
a rendering area correction unit that generates rendering area information by performing a correction to the rendering area computed by the rendering area computing unit;
a rendering data correction unit that generates data optimal for rendering by performing a correction to the fill-in information stored in the fill-in information storage unit; and
a rendering unit that renders the polygon by use of the rendering area information and the data generated by the rendering data correction unit.

2. The apparatus according to claim 1, further comprising a vector data group correction unit that performs a correction to the vector data included in the vector data group managed by the vector data group management unit, to thus delete and merge a redundant vector data included in the vector data group.

3. The apparatus according to claim 1, wherein the rendering data correction unit updates the fill-in information stored in the fill-in information storage unit, based on the generated data optimal for rendering, and
wherein the rendering unit renders the polygon by use of the rendering area information and the fill-in information stored in the fill-in information storage unit.

4. The apparatus according to claim 1, wherein the rendering unit renders the polygon by use of the rendering area information and the fill-in information stored in the fill-in information storage unit, and
wherein the rendering data correction unit performs the correction to rendering data obtained from the rendering unit and restores the corrected rendering data to the rendering unit while operating cooperatively with the rendering unit.

5. The apparatus according to claim 1 further comprising a fill-in information correction unit that corrects the fill-in information computed by the fill-in information computing unit in accordance with a predetermined rendering rule,
wherein the fill-in information registration unit registers into the fill-in information storage unit the fill-in information corrected by the fill-in information correction unit.

6. The apparatus according to claim 1, wherein the target point management unit determines the target point to be processed by use of notification indicating completion of the processing of the target, the notification being acquired from the fill-in information computing unit.

7. The apparatus according to claim 1, further comprising forming the vector data group through a single writing stroke.

8. The apparatus according to claim 1, wherein the target point determination unit determines whether or not to fill in each of pixels positioned on both sides of the coordinates of the target point to be processed by determining whether the target point is the starting-point of the vector data or the end-point of the vector data.

9. The apparatus according to claim 8, wherein when it is determined that the target pixel is not the starting-point or the end-point, and the target pixel is outside the polygon, pixels on both sides of the target pixel are not filled in.

10. The apparatus according to claim 8, wherein when it is determined that the target pixel is the end point, pixels on the left side of the target pixel are filled in and pixels on the right side of the target pixel are not filled in.

11. The apparatus according to claim 8, wherein when it is determined that the target pixel is the starting-point, pixels on the right side of the target pixel are filled in and pixels on the left side of the target pixel are not filled in.

12. The apparatus according to claim 8, wherein when it is determined that the target pixel is not the starting-point or the end-point, and the target pixel is inside the polygon, pixels on both sides of the target pixel are filled in.

13. A graphics-rendering apparatus comprising:
a vector data group management unit that manages a vector data group including sets of vector data forming a polygon;
a vector data extraction unit that extracts vector data as a target vector to be processed from the vector data group;
a determining unit that determines which parts of the polygon are to be filled in, including:
a starting-point-and-end-point computing unit that computes starting-point-and-end-point information that indicates starting and end points of the processing, based on the vector data extracted by the vector data extraction unit;
a target point management unit that generates a second management information for managing a target point by determining the target point to be processed in accordance with the starting-point-and-end-point information, and notifies the vector data group management unit of completion of processing of the target vector;
a target point computing unit that computes coordinates of a pixel of the target point to be processed;
a target point determination unit that determines whether or not to fill in each of pixels positioned at both sides of the coordinates of the pixel of the target point to be processed by examining a vector of the vector data set forming the polygon and considering (i) positional relations of the pixel of the target point relative to the examined vector, and (ii) whether the examined vector changes from right to left or left to right;
a fill-in information computing unit that computes fill-in information regarding the target point based on the determination result of the target point determination unit and predefined rules for filling in a closed area of the polygon; and
a rendering unit that renders the polygon with the computed fill-in information.

14. The apparatus according to claim 13, wherein the target point determination unit determines whether or not to fill in each of pixels positioned on both sides of the coordinates of the target point to be processed by determining whether the target point is the starting-point of the vector data or the end-point of the vector data.

15. The apparatus according to claim 14, wherein when it is determined that the target pixel is not the starting-point or the end-point, and the target pixel is outside the polygon, pixels on both sides of the target pixel are not filled in.

16. The apparatus according to claim 14, wherein when it is determined that the target pixel is the end point, pixels on the left side of the target pixel are filled in and pixels on the right side of the target pixel are not filled in.

17. The apparatus according to claim 14, wherein when it is determined that the target pixel is the starting-point, pixels on the right side of the target pixel are filled in and pixels on the left side of the target pixel are not filled in.

18. The apparatus according to claim 14, wherein when it is determined that the target pixel is not the starting-point or the end-point, and the target pixel is inside the polygon, pixels on both sides of the target pixel are filled in.

19. The apparatus according to claim 13, further comprising forming the vector data group through a single writing stroke.

* * * * *